United States Patent
Brown et al.

(10) Patent No.: US 10,749,767 B2
(45) Date of Patent: *Aug. 18, 2020

(54) ROUTING ACTIONS TO USER DEVICES BASED ON A USER GRAPH

(71) Applicant: Microsoft Technology Licensing, LLC, Redmond, WA (US)

(72) Inventors: Jared A. Brown, Seattle, WA (US); Eddie Fusaro, Sammamish, WA (US); Gurpreet Virdi, Redmond, WA (US); Murari Sridharan, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 117 days.

This patent is subject to a terminal disclaimer.

(21) Appl. No.: 16/053,483

(22) Filed: Aug. 2, 2018

(65) Prior Publication Data

US 2018/0343178 A1 Nov. 29, 2018

Related U.S. Application Data

(63) Continuation of application No. 15/010,655, filed on Jan. 29, 2016, now Pat. No. 10,069,697.

(51) Int. Cl.
*H04L 12/26* (2006.01)
*G06F 9/50* (2006.01)
*G06Q 50/00* (2012.01)
*G06Q 30/02* (2012.01)
*H04L 29/08* (2006.01)

(52) U.S. Cl.
CPC .......... *H04L 43/045* (2013.01); *G06F 9/5027* (2013.01); *G06Q 30/02* (2013.01); *G06Q 50/01* (2013.01); *H04L 67/22* (2013.01)

(58) Field of Classification Search
None
See application file for complete search history.

(56) References Cited

U.S. PATENT DOCUMENTS

| | | | |
|---|---|---|---|
| 8,538,676 B2 * | 9/2013 | Wuersch | G08G 1/005 701/400 |
| 2007/0143398 A1 * | 6/2007 | Graham | G06Q 40/02 709/204 |
| 2012/0127066 A1 * | 5/2012 | Iida | G11B 27/322 345/84 |
| 2013/0110565 A1 * | 5/2013 | Means, Jr. | G06Q 10/06 705/7.11 |

(Continued)

Primary Examiner — Davoud A Zand
(74) Attorney, Agent, or Firm — Rainier Patents, P.S.

(57) ABSTRACT

A routing system is described herein for intelligently routing actions directed to any one of a collection of user devices that are associated with a user. In operation, the routing system receives a request from a source entity to perform an action. The routing system determines a mode of carrying out the action that involves use of one or more user devices, selected from the collection of user devices. It then instructs the selected user device(s) to carry out the action. In this manner of operation, requests that are directed to an individual user device are no longer necessarily carried out by that individual user device. The routing system chooses the user device(s) to carry out the action based on current context information together with relationship information extracted from a user graph.

20 Claims, 14 Drawing Sheets

(56) References Cited

U.S. PATENT DOCUMENTS

| | | | |
|---|---|---|---|
| 2016/0098081 A1* | 4/2016 | Takahashi | A61B 5/681 340/5.51 |
| 2016/0154620 A1* | 6/2016 | Tsuda | G06F 19/3481 345/633 |
| 2016/0283463 A1* | 9/2016 | M R | G06N 5/022 |

* cited by examiner

ROUTING ACTIONS TO USER DEVICES BASED ON A USER GRAPH

CROSS-REFERENCE TO RELATED APPLICATIONS

This patent application is a continuation of, and claims priority to, U.S. patent application Ser. No. 15/010,655, filed on Jan. 29, 2016, which is incorporated herein by reference in its entirety.

BACKGROUND

In current practice, users interact with a number of user devices throughout the course of a day, including traditional desktop personal computing devices, tablet-type computing devices, smartphones, game consoles, set-top boxes, wearable computing devices, and so on. Each user device generally operates in a standalone processing environment, governed by a device-centric operating system. Each user device is entrusted to handle only those actions that are specifically directed to it.

SUMMARY

A routing system is described herein for intelligently routing actions directed to any one of a collection of user devices that are associated with a user. In operation, the routing system receives a request from a source entity to perform an action. The routing system determines a mode of carrying out the action that involves the use of one or more user devices, selected from the collection of user devices. It then instructs the selected user device(s) to carry out the action. In this manner of operation, requests that are directed to an individual user device are no longer necessarily carried out by that individual user device, as the traditional primacy of individual user devices is now subordinated to the managing role of the routing system.

A request processed by the routing system may identify any computer-implemented action. For instance, the request that is received by the routing system may correspond to an instruction from a source entity to present information (e.g., a notification) to the user. Or the request may correspond to an instruction from the user to send information to one or more other users. Or the request may correspond to an instruction from the user to perform a computer-implemented processing task, such as the execution of a particular resource-intensive algorithm. Or the request may correspond to an instruction from the user to find and retrieve information.

In one manner of operation, the routing system chooses the user device(s) to carry out the action based on current context information together with relationship information extracted from a user graph. The user graph identifies relationships, on a per-context basis, between the user and at least: other people; locations; action-related information; time-related information; and device-related information. For instance, the user graph may describe the inclinations of the user on a per-context basis, indicating that the user prefers to use a particular user device in one contextual situation, while using another user device in another contextual situation. A graph-forming component generates the user graph for the user based on explicit instructions provided by the user and based on the actions that the user takes within his or her environment, on a context-by-context basis.

The above technique can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

Figure 1:
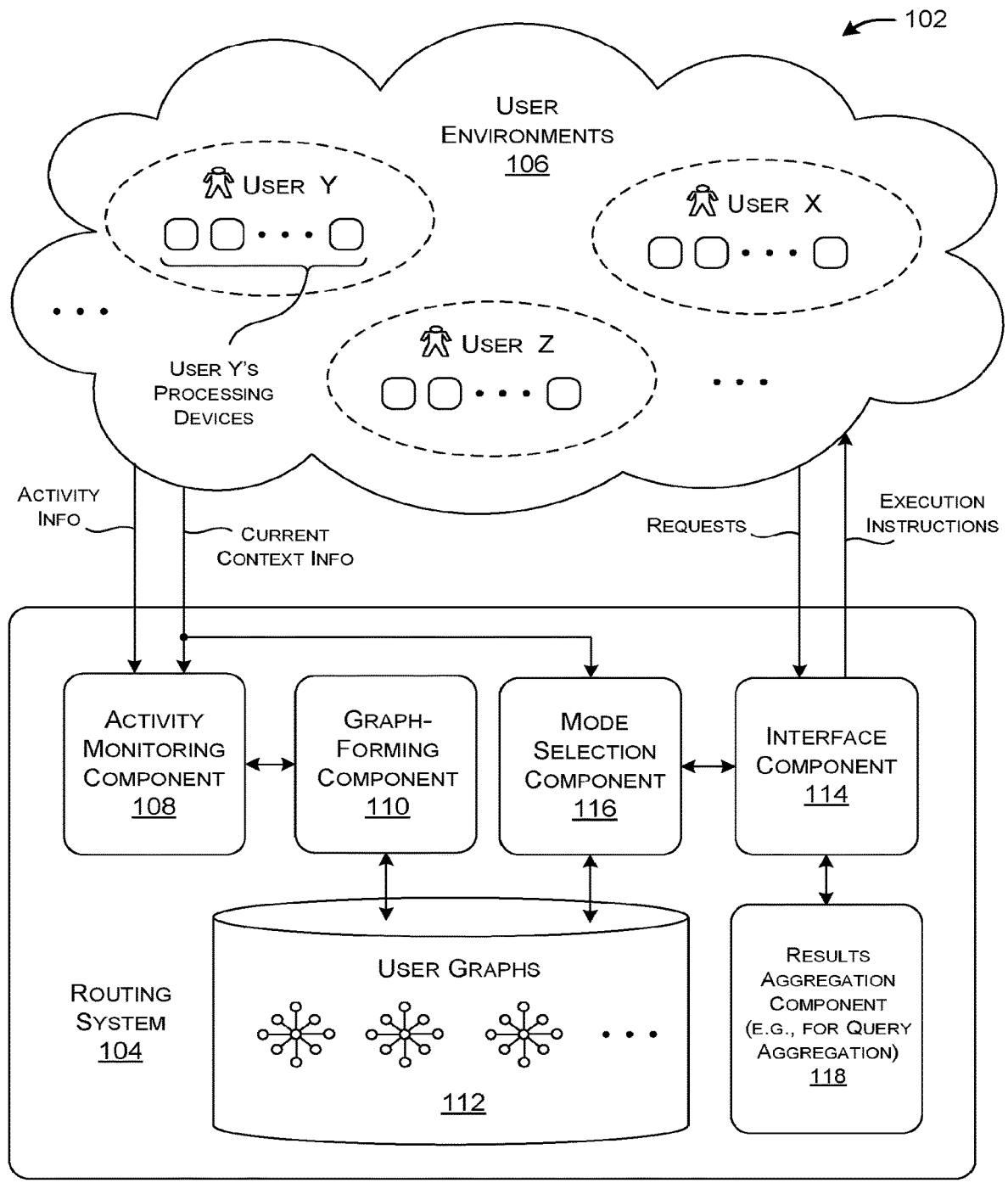
FIG. 1 shows an illustrative processing environment that uses a routing system to manage the execution of actions.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes a routing system for managing the execution of actions by a collection of user devices. Section B sets forth illustrative methods which explain the operation of the routing system of Section A. And Section C describes illustrative computing functionality that can be used to implement any aspect of the features described in Sections A and B.

As a preliminary matter, some of the figures describe concepts in the context of one or more structural components, also referred to as functionality, modules, features, elements, etc. In one implementation, the various components shown in the figures can be implemented by software running on computer equipment, or hardware (e.g., chip-implemented logic functionality), etc., or any combination thereof. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component. Section C provides additional details regarding one illustrative physical implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). In one implementation, the blocks shown in the flowcharts can be implemented by software running on computer equipment, or hardware (e.g., chip-implemented logic functionality), etc., or any combination thereof.

As to terminology, the phrase "configured to" encompasses various physical and tangible mechanisms for performing an identified operation. The mechanisms can be configured to perform an operation using, for instance, software running on computer equipment, hardware (e.g., chip-implemented logic functionality), etc., or any combination thereof.

The term "logic" encompasses various physical and tangible mechanisms for performing a task. For instance, each operation illustrated in the flowcharts corresponds to a logic component for performing that operation. An operation can be performed using, for instance, software running on computer equipment, hardware (e.g., chip-implemented logic functionality), etc., or any combination thereof. When implemented by computing equipment, a logic component represents an electrical component that is a physical part of the computing system, in whatever manner implemented.

Any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific terms "computer-readable storage medium" and "computer-readable storage medium device" expressly exclude propagated signals per se, while including all other forms of computer-readable media.

The following explanation may identify one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Finally, the terms "exemplary" or "illustrative" refer to one implementation among potentially many implementations.

A. Illustrative System

A.1. Overview

FIG. 1 shows an illustrative processing environment 102 that uses a routing system 104 to manage the execution of actions. The routing system 104 processes requests provided by user devices within a plurality of user environments 106. In response, the routing system 104 determines the manner in which the requests are to be processed by the user devices.

As used herein, a "user device" may correspond to any resource associated with a user that performs a processing function. In some cases, a user device may correspond to a physical computing device, such as a desktop personal computing device, a smartphone, a game console device, a wearable computing device, etc. But in other cases, the user device may correspond to functionality provided by one or more computing devices, rather than the computing device(s) themselves. In the latter cases, the user device can be considered a virtual user device. A virtual user device, for instance, may correspond to a service, application, account, etc. associated with the user that performs any function, as implemented by any computing device(s) that are local and/or remote with respect to the user. In some cases, a user is "associated with" a user device because he or she owns, or at least controls, that device. In another case, a user is more loosely associated with a user device because the user is capable of interacting with that user device, although the user may not own or control that device.

FIG. 1 provides a logical depiction of the routing system 104. The routing system 104 operates in a background mode and in a dynamic request-driven mode. In the background mode, an activity monitoring component 108 receives activity information from the user devices in the user environments 106. The activity information describes the actions taken by users in the course of interacting with their respective user devices. The activity information also describes the environment-related context in which the actions are performed. For example, consider a user Y who interacts with a smartphone while riding a bus on his or her way to work. The activity information for that event can identify the particular application(s) with which the user Y interacts, the times at which the user interacts with those application(s), the other user(s) with whom the user interacts via those application(s), and so on. The activity information can also describe the location(s) at which the user Y performs the above-noted actions, the presence of other users in the vicinity of the user Y, and so on.

A graph-forming component 110 generates a user graph for each user based on the activity information associated with that user and based on explicit instructions provided by that user. Each user graph identifies relationships between an identified user and at least: other people; locations; action-related information; time-related information; and device-related information. In one formulation, the user graph can express the above relationships as a collection of nodes and edges (links). A "center" node represents the identified user, making the identified user the "pivot" of the user graph. Other nodes represent aspects of the user's environment, such as locations, people, activities, etc. A link that connects any two nodes represents a relationship between two corresponding real-word features.

Overall, a user graph provides a summary of the way that the user interacts with his or her environment. That summary is not just a testament of the user's likes and dislikes, but catalogs the user's inclinations on a per-context basis. For example, the graph may reveal that the user prefers to use a certain device to perform a certain activity at a certain place and/or in the company of certain people, yet prefers to use another device to perform the same activity when at a different place and/or in the company of other people. Subsection A.3 (below) provides further information regarding the illustrative composition of a user graph.

The graph-forming component 110 stores each user graph that it creates in a data store 112. The data store 112 may correspond to any repository of data provided at a single location or distributed over plural locations. The graph-forming component 110 also dynamically updates each user graph based on new activity information that it receives (and/or does not receive) and/or the explicit information supplied by the user. For instance, based on newly received activity information pertaining to a user graph, the graph-forming component 110 can add new nodes, delete existing nodes, add new relationships (links), delete existing relationship, modify strengths of existing relationships, and so on. In addition, the user can explicitly make any of the above-indicated modifications, e.g., by adding or removing an individual from an "inner circle" designation of contacts, adding or removing a location from a collection of favorite locations, and so on.

In the real-time dynamic mode of operation, an interface component 114 receives a request from a source entity that identifies an action to be performed. The request pertains to an identified user, such as user X.

A mode selection component 116 receives the request forwarded by the interface component 114, together with an instance of current context information. The current context information describes the current circumstances in which the request has been made. In response to the request, the mode selection component 116 extracts relationship information from user X's graph. The mode selection component 116 then determines a mode of carrying out the action. The determined mode involves the use of one or more user devices associated with the user X. The mode selection component 116 makes its decision based on the current context information together with relationship information that it extracts from user X's user graph.

The mode selection component 116 then notifies the interface component 114 of the mode that has been selected. The interface component 114, in turn, sends an instruction to the user device(s) that are to carry out the action, per the selected mode. That instruction requests the user device(s) to carry out the action.

More generally, the routing system 104 treats user X's user devices as subordinate resources from which it may draw to carry out actions. In this manner of operation, a request that is directed to an individual user device is no longer necessarily carried out by that individual user device, as the traditional primacy of individual user devices is now subordinated to the managing role of the routing system 104. Stated in another way, the routing system 104 can be viewed as a higher-order operating system that manages processing resources provided by individual user devices.

A request processed by the routing system 104 may correspond to any computer-implemented action. For instance, the request that is received by the routing system 104 may correspond to an instruction from a source entity to present information to the user X. Or the request may correspond to an instruction from the user to send information to a group of other users, including at least one member. Or the request may correspond to an instruction from the user X to perform a computer-implemented processing task, such as the execution of a resource-intensive algorithm. Or the request may correspond to an instruction from the user X to find and retrieve information. Subsection A.2 (below) provides additional details regarding each of these illustrative scenarios.

A results aggregation component 118 serves a role in some scenarios, but not other scenarios. Consider the case in which a user uses one of his or her user devices to make a request to find and retrieve certain information. The routing system 104 may send instructions to all of the user's devices, or a context-based group of the user's devices, which instruct these devices to perform respective local searches. The results aggregation component 118 receives partial results generated by the respective user devices. The results aggregation component 118 aggregates these partial results to produce final results. The interface component 114 can then forward the final results to the requesting user using a presentation mode selected by the mode selection component 116.

Subsection A.4 (below) provides additional information regarding each component of the routing system 104 shown in FIG. 1.

Figure 2:
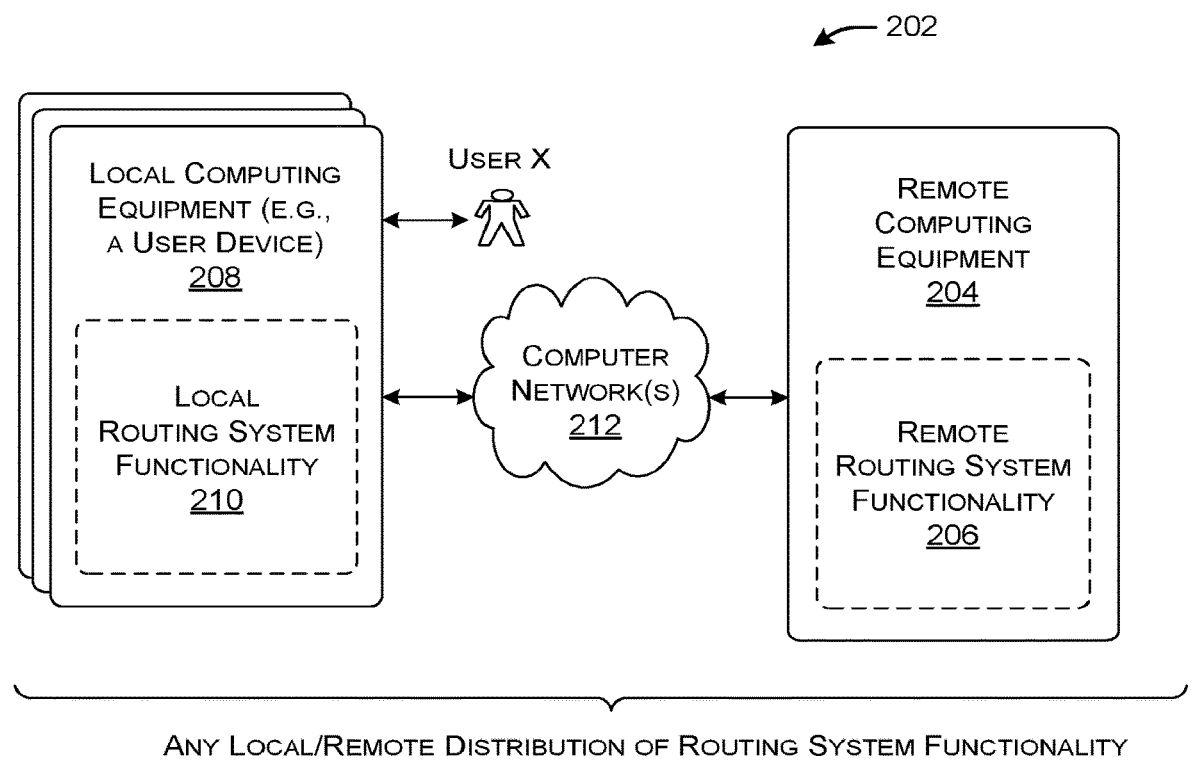
FIG. 2 shows computing equipment that can implement the processing environment of FIG. 1.

FIG. 2 shows computing equipment 202 that can implement the routing system 104 of FIG. 1, with respect to a user X. In a first implementation, remote computing equipment 204 is used to implement the entirety of the routing system 104. Here, "remote" means that the remote computing equipment 204 is provided in a remote location (or locations) with respect to the location of each user device associated with the user X. The remote computing equipment 204 may implement the routing system 104 using remote routing system functionality 206, e.g., which may correspond to code which implements the functions described above. In terms of physical implementation, the remote computing equipment 204 may correspond to one or more server computing devices or the like, provided at a single location or distributed across multiple locations.

In a second implementation, local computing equipment 208 is used to implement the entirety of the routing system 104. For instance, each user device associated with user X (corresponding to an instance of the local computing equipment 208) may implement an entire instance of the routing system 104 using local routing system functionality 210. With respect to the data store 112, the local computing equipment 208 can at least store the user graph associated with the user X. Other local computing equipment (not shown) associated with other users can store the user graphs that are associated with those other users. In terms of physical implementation, the local computing equipment 208 may correspond to any of: a stationary desktop personal computing device, a laptop computing device, a set-top box, a game console device, a tablet-type computing device, a smartphone, a media consumption device, a wearable computing device, and so on, or any combination thereof.

To be more concrete, in a local implementation, assume that a first user device, associated with user X, receives a request to perform an action. The user device implements a full instance of the routing system 104. Assume that the instance of the routing system 104 determines that a second user device (also associated with the user X) is best equipped to handle the action. The routing system 104 of the first user device therefore sends an instruction to the second user device, requesting it to handle the action.

In a third implementation, a combination of the remote computing equipment 204 and the local computing equipment 208 is used to implement the routing system 104. For instance, the remote computing equipment 204 can handle resource-intensive tasks, such as the graph-managing tasks performed by the graph-forming component 110. The remote computing equipment 204 can also provide the data store 112 which stores the user graphs. Each user device, corresponding to an instance of the local computing equipment 208, can handle other aspects of the routing system 104, such as the real-time processing of individual requests. In the course of processing requests, the local computing equipment 208 can interact with the remote computing equipment 204 to access a user graph.

One or more computer networks 212 couple the local computing equipment 208 to the remote computing equipment 204. The computer network(s) 212 may correspond to a wide area network (e.g., the Internet), a local area network, etc., or combination thereof.

A.2. Illustrative Mode-Selecting Scenarios

Figure 3:
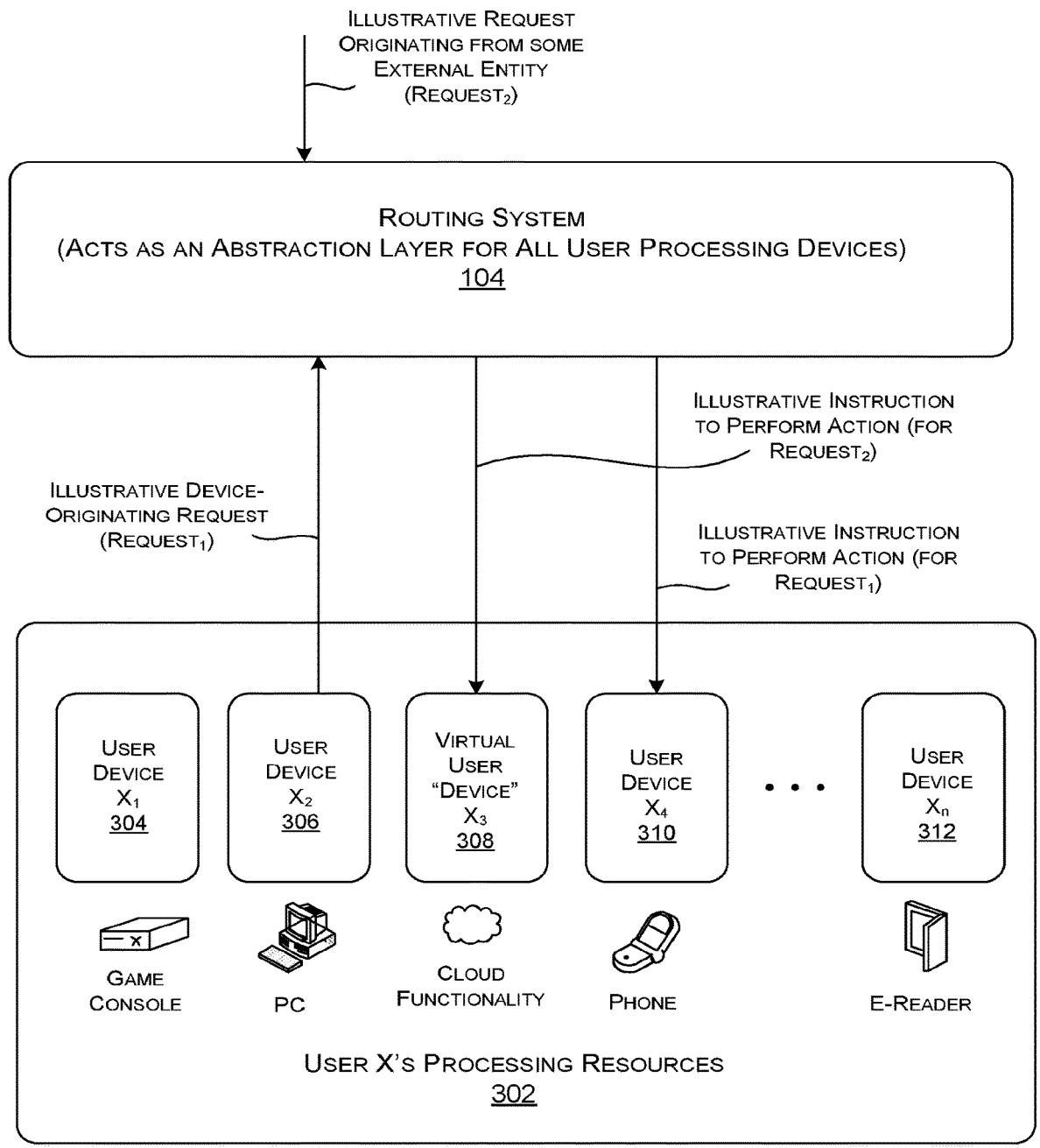
FIG. 3 depicts a general scenario in which the routing system (of FIG. 1) processes requests originating from a collection of user devices, and/or from external source entities.

FIG. 3 depicts a general scenario in which the routing system 104 processes requests originating from a collection of user devices 302, and/or from external source entities. The collection of user devices 302 includes at least user devices (304, 306, 308, 310, . . . , 312). Some of the user devices may correspond to physical user devices, such as game consoles, desktop personal computing devices, smartphones, media consumption devices (e.g., E-reader devices), etc. Other user devices may correspond to virtual user devices, such as cloud-implemented services, etc.

In one scenario, the user device $X_2$ 306 generates a first request (request$_1$) for an action. For example, the user X may interact with the user device $X_2$ 306 to make a request to send information to another user. Or the user X may interact with the user device $X_2$ 306 to request the execution of some processing task (such as the printing of a document). Or the user X may interact with the user device $X_2$ 306 to request information regarding a particular topic, and so on.

In another scenario, an external source entity generates a second request (request$_2$) for a service. For example, another user Y may interact with his or her user device (not shown) to send information to user X in the form of a message. In another case, the external source entity may correspond to some automated entity which sends a notification, such as a calendaring system maintained by some external computing system.

The routing system 104 allocates the action associated with the first request$_1$ to user device $X_4$ 310. It allocates the action associated with the second request$_2$ to virtual user device $X_3$ 308. In other cases, although not shown in FIG. 3, the routing system 104 can allocate any action to two or more user devices. Those user devices may perform the action in parallel and/or series fashion.

More generally stated, the routing system 104 determines a mode to be used to perform an action specified by a request. In the example of FIG. 3 (and many other examples in this description), the routing system 104 principally determines a mode by selecting the user device(s) to be used to handle the action. Note, however, that the concept of "mode" has broader implications. For instance, the routing system 104 can, alternatively, or in addition, define a mode with respect to the manner in which a user device handles an action. As such, a single physical user device can implement two or more respective modes for carrying out an action, and the routing system 104 can select among these modes.

For example, the routing system 104 can determine that a communication has relatively high importance; in response, the routing system 104 selects a mode which delivers the communication to selected user device(s) in a privileged manner. For instance, the routing system 104 can instruct selected user device(s) to display a notification of a missed call having high importance in a highlighted manner. In another case, the routing system 104 can define a mode which causes several messages that are sent by the same sender within a specified span of time (e.g., within the last hour) to be consolidated into a single notification. The routing system 104 alerts the user X to the existence of the multiple messages by the sender via the single notification.

Figure 4:
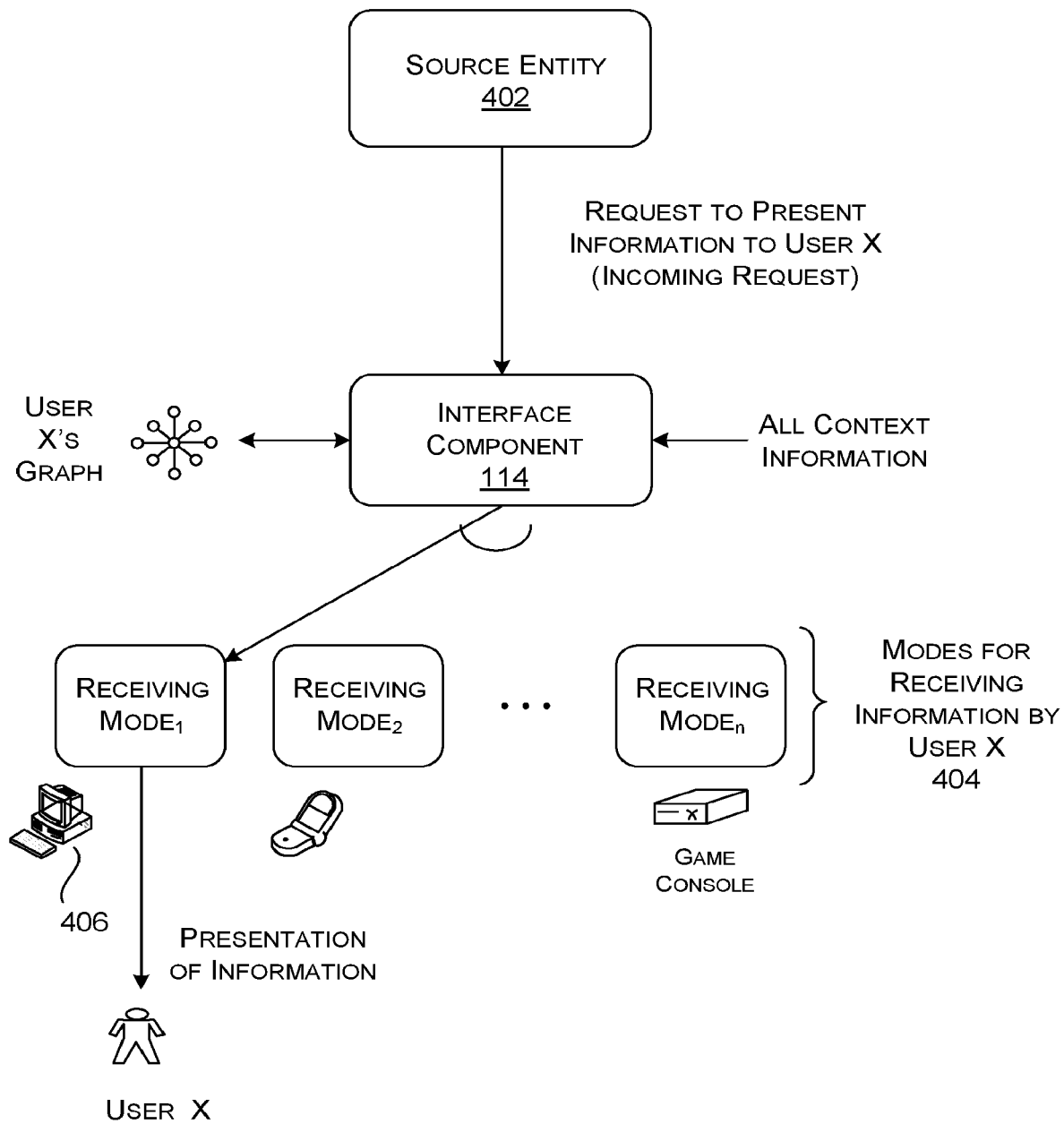
FIG. 4 depicts a more specific scenario (compared to FIG. 3) in which a source entity makes a request to present information to an identified user.

FIG. 4 depicts a more specific scenario (compared to FIG. 3) in which a source entity 402 makes a request to present information to an identified user X. In this case, the routing system 104 selects a particular mode (mode$_1$) of carrying out the action, from among a plurality of possible modes 404. The routing system 104 chooses the mode$_1$ based on the user graph associated with user X in conjunction with current context information. The selected mode$_1$ involves the use of a particular user device 406 (e.g., a personal computing device) associated with user X.

The mode-selection component 116 can choose the user device 406 based on any combination of contextual factors. One such factor pertains to the capabilities of the user device 406. Another factor pertains to the location of the user in relation to the user device 406, or the projected future location of the user in relation to the user device 406. Many other contextual factors are described below.

Figure 5:
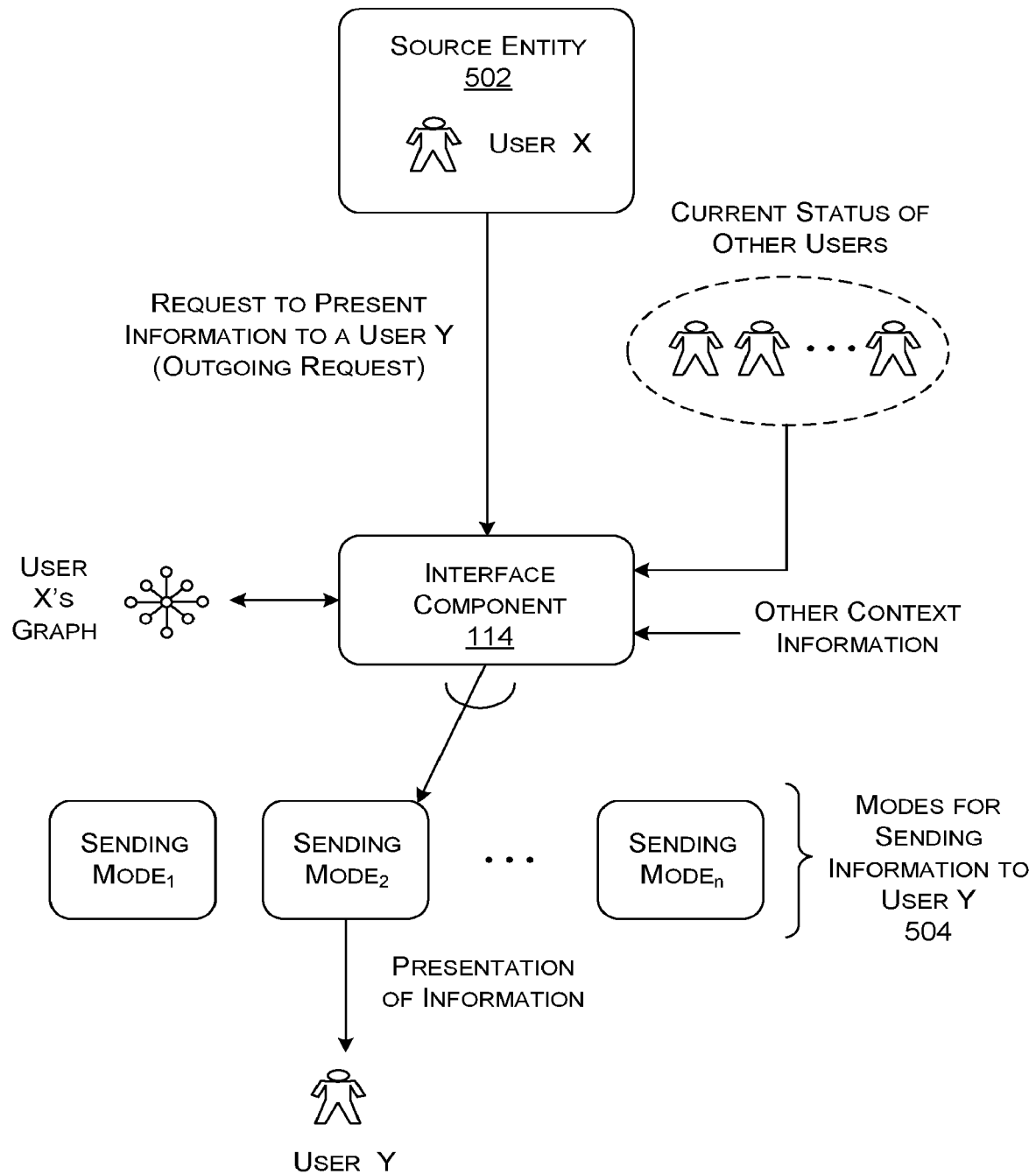
FIG. 5 depicts a specific scenario in which the identified user makes a request to present information to some other user.

FIG. 5 depicts another specific scenario in which the identified user X (corresponding to a source entity 502) makes a request to present information to some other user (e.g., user Y). Here, the routing system 104 selects a particular mode (mode$_2$) of carrying out the action, from among a plurality of possible modes 504. Again, the routing system 104 chooses the mode$_2$ based on the user graph associated with the user X in conjunction with current context information.

In the case of FIG. 5, assume that the user graph for user X indicates that the user Y has a close relationship to user X. The routing system 104 can take this knowledge into account when choosing a mode to send the information to the user Y. In addition, or alternatively, assume that the current context information indicates that the user Y is in relatively close proximity to user X (e.g., in the same room) at the time that the request is generated. The routing system 104 can also take this knowledge into account when choosing an appropriate mode. For example, the routing system 104 may choose a mode that will result in the information being presented to both user X and user Y at the same time, such as by routing the information to a television monitor in a room in which both user X and user Y are currently present, via a set-top box.

As indicated above, the routing system 104 makes its mode-selection decision in the scenario of FIG. 5 based on the user graph associated with user X, the sender of the information. However, in other implementations, the routing system 104 can make its mode-selection decision based on the user graph associated with user Y (the recipient), or the user graphs for both users X and Y. For instance, assume that the user X's user graph indicates that user X prefers to communicate with user Y using a particular mode$_1$. This is one factor in favor of choosing that mode. But assume that user Y's user graph indicates that this person prefers to receive messages from user X using mode$_1$. The routing system 104 can take both of these factors into account when selecting an appropriate mode, such as by selecting a mode that is agreeable to both users X and Y.

In other implementations, the sending and receiving of a message, described in FIG. 5, can optionally involve two phases of the application of the routing system 104. In the first phase, the routing system 104 can consult the user X's user graph to determine an appropriate manner of sending a message to user Y, e.g., by choosing a particular user device associated with user X. In a second phase, the routing system 104 can consult the user Y's user graph to determine an appropriate manner of presenting the message to user Y, e.g., by choosing a particular user device associated with user Y. In the first phase, the routing system 104 is operating on behalf of user X. In the second phase, the routing system 104 is operating on behalf of user Y. These separate analyses, however, are connected in the sense that user X's graph may incorporate knowledge about how user X prefers to interact with user Y, and vice versa. In yet other cases, as stated above, the routing system 104 can merge its analysis by selecting a mode based on the user graphs of user X and user Y.

Figure 6:
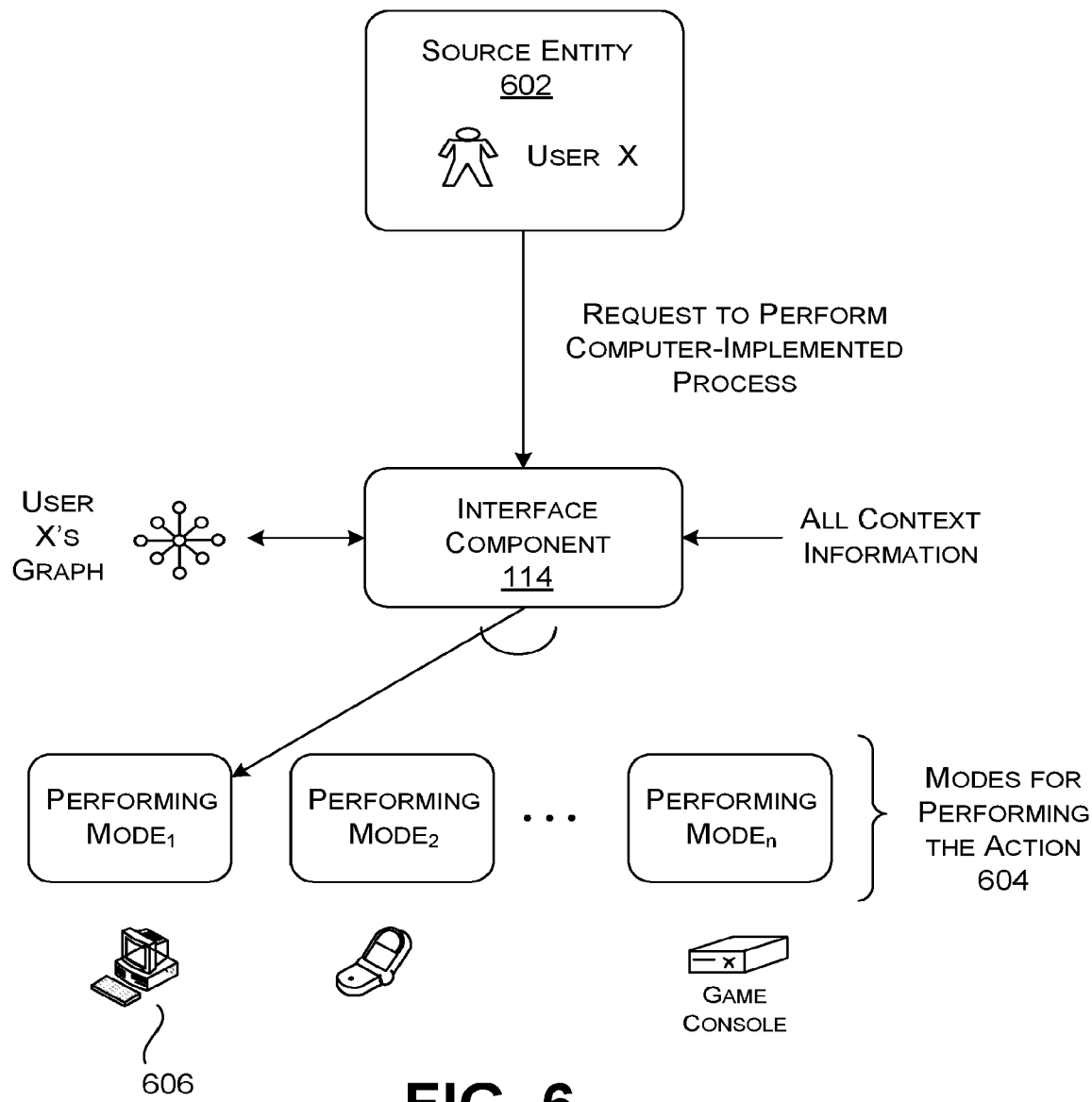
FIG. 6 depicts a specific scenario in which the identified user makes a request to perform a computer-implemented process.

FIG. 6 depicts a specific scenario in which the identified user X (corresponding to a source entity 602) makes a request to perform a computer-implemented task; the task, for instance, may entail transforming data from one format to another, etc. Assume that the user makes this request using a particular user device, referred to here as an "origin" user device. The routing system 104 responds to the request by selecting a particular mode (mode$_1$) of carrying out the action, from among a plurality of possible modes 604. Again, the routing system 104 chooses the mode$_1$ based on the user graph associated with user X in conjunction with current context information. The mode$_1$ involves the use of a particular user device 606 that has sufficient processing resources to handle the processing task. The routing system 104 may choose the user device 606 over the origin user device (from which the user issued the request) because the origin user device does not have sufficient processing resources to handle the processing task. In other cases, the routing system 104 may choose to implement the task on the origin user device.

Figure 7:
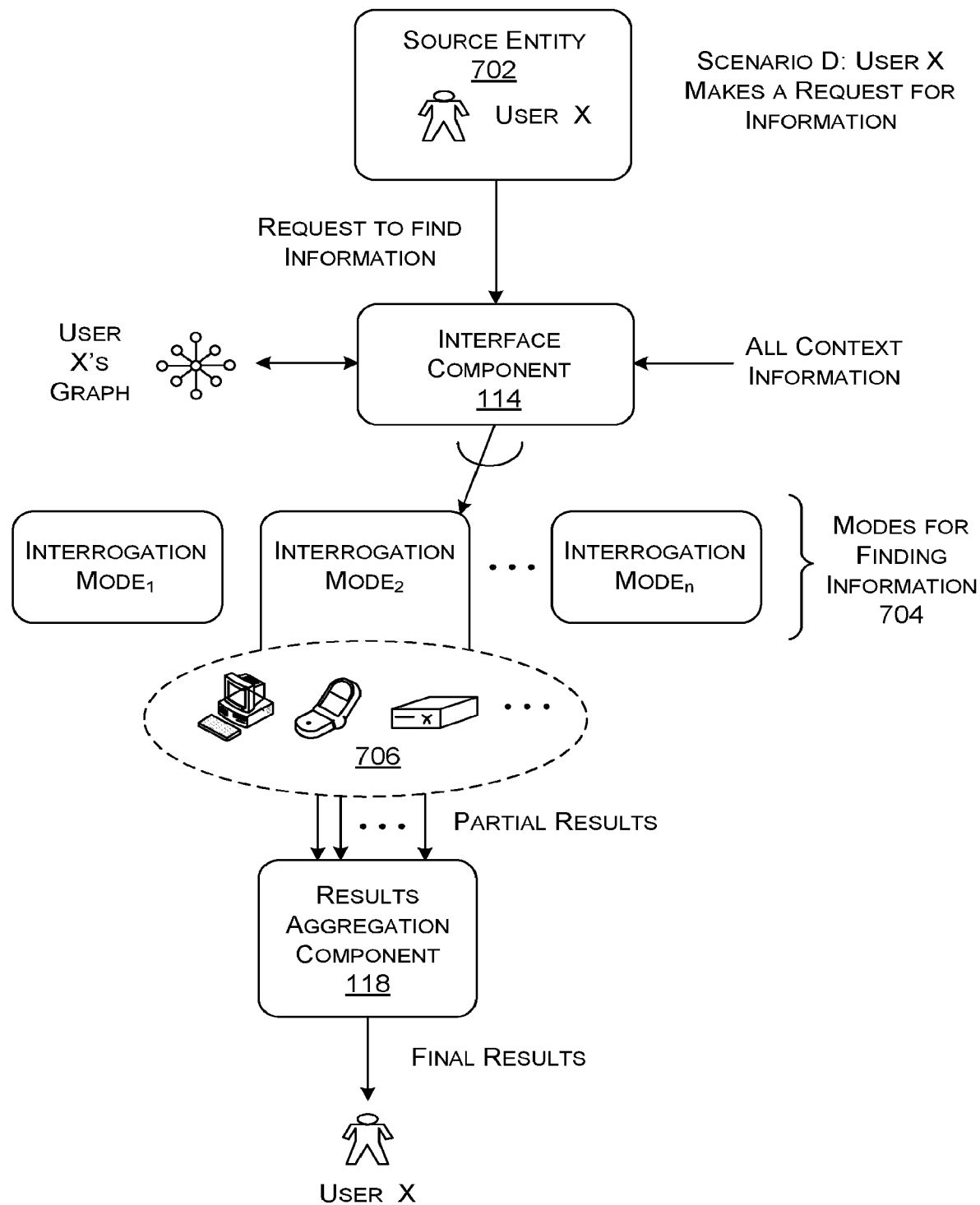
FIG. 7 depicts a specific scenario in which the identified user makes a request to find information.

FIG. 7 depicts a specific scenario in which the identified user X (corresponding to a source entity 702) makes a request to find and retrieve information. For instance, the user X may want to see a list of missed calls that have been received over a span of time, or a list of documents accessed by his or her user devices. In this case, the routing system 104 selects a particular mode (mode$_2$) of carrying out the action, from among a plurality of possible modes 704. The routing system 104 chooses the mode$_2$ based on the user graph associated with user X in conjunction with current context information. The selected mode$_2$ involves the use of a set of user devices 706. More specifically, the selected mode$_2$ can involve the use of all of the user's user devices, or some subset of those devices. The routing system 104 can leverage the context information and relationship information in choosing the set of devices.

Each user device includes an agent that carries out a query function when it is invoked by an instruction from the interface component 114. For instance, when invoked, a user device's agent consults it local data store to determine an answer to user X's query. It formulates the results of its search as partial results, and provides the partial results to the results aggregation component 118. The results aggregation component 118 aggregates the partial results provided by all of the user devices 706 to generate final results, and, optionally, removes duplicate information in the plural instances of partial results that it has received. Finally, the interface component 114 sends the final results to the user X via some mode specified by the routing system 104.

In another scenario, the user X makes a request to perform some resource-intensive processing task, such as by performing the MapReduce algorithm on a data set. In response, the routing system 104 allocates different parts of the processing task to the user devices 706. The user devices 706 operate in parallel and/or series on the processing task to generate plural instances of partial results. The results aggregation component 118 assembles the partial results into final results, and the interface component 114 sends the final results to the requesting user X via an identified mode.

The scenarios described above are set forth in the spirit of illustration, not limitation. The routing system 104 can be applied to other types of requests that specify other types of computer-implemented actions.

A.3. An Illustrative User Graph

Figure 8:
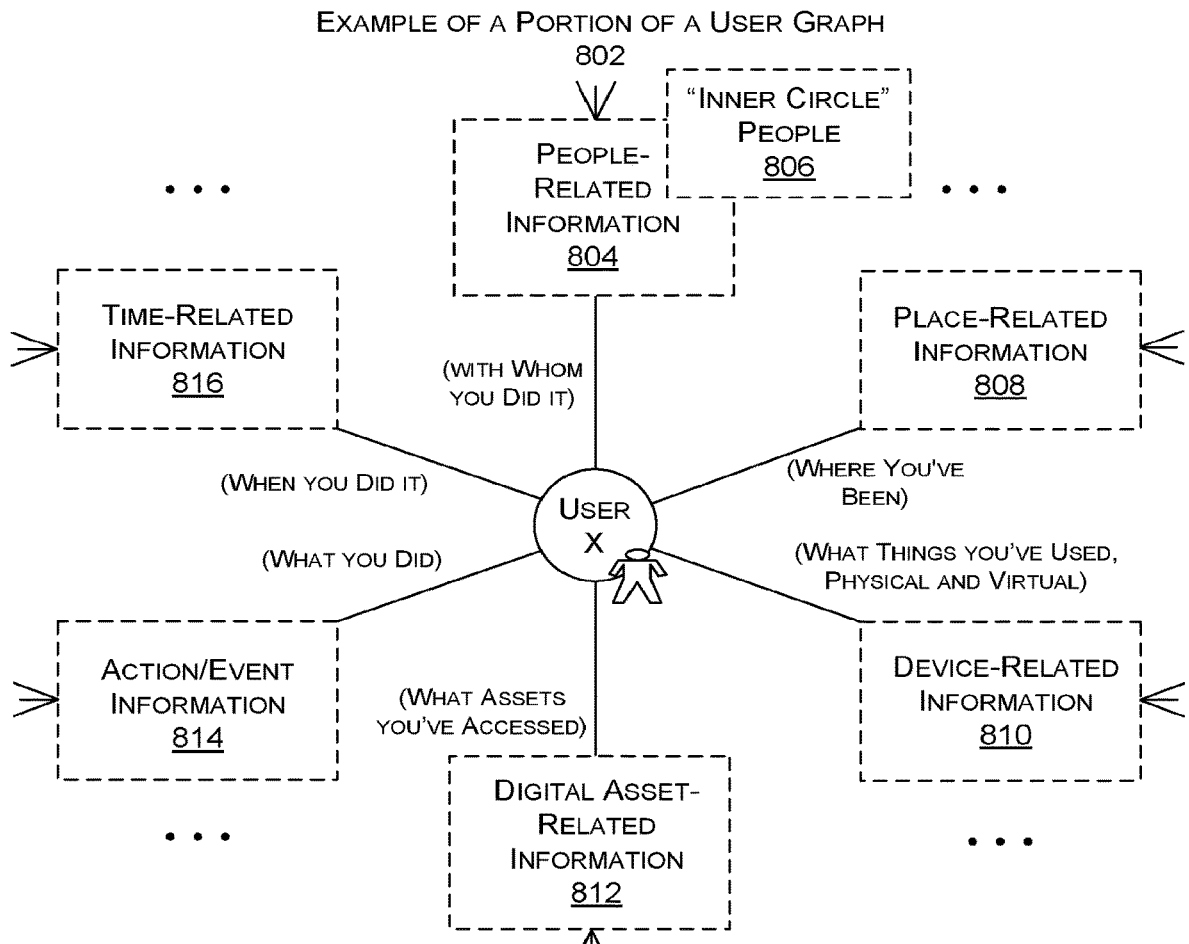
FIG. 8 shows a high-level representation of an illustrative user graph.

FIG. 8 represents a portion 802 of a user graph that is associated with the user X. The user graph can be conceptualized as providing a "center" node that represents user X. The user graph provides satellite nodes that relate to various features of user X's environment. A link between any two nodes identifies a relationship between two corresponding features. The graph may also annotate each link with a score (a weight value). The score describes the strength of a relationship between two connected nodes. For example, consider the case in which a link connects a node associated with the user X with a node associated with some feature of the environment; the score of that link may reflect the relative importance of that feature in the environment to the user X, with respect to a particular context.

FIG. 8 groups features (and corresponding nodes) into high-level categories for the purpose explaining the types of information items that a user graph may convey (rather than necessarily explaining the specific structure of the graph itself). People-related information 804 describes people with whom the user X has some association. The people-related information 804 can also characterize the nature of the relationship between each identified person and the user X. For example, the people-related information 804 can identify a person as being a wife, husband, child, sibling, mother, father, friend, work colleague, a provider of some service, etc. with respect to user X. The people-related information 804 can also identify the security/privacy-related relationship between a person and the user X, which has a bearing on the type of information that can be appropriately exchanged between these two people.

In some implementations, the people-related information 804 specifically identifies "inner circle" people 806 with whom the user has a particularly close relationship, as defined by some threshold level of relatedness. For example, the inner circle people 806 can include family members, friends, some work colleagues, etc. In some cases, the graph-forming component 110 can infer a close relationship between the user X and other people. In other cases, the user X can explicitly add (and remove) people from the group of inner circle people 806.

Place-related information 808 describes locations associated with the user X. For example, the place-related information 808 can describe locations that user X frequently visits.

Device-related information 810 describes devices associated with the user X. For example, the device-related information 810 can identify the physical user devices associated with the user X, the virtual user devices associated with the user X, and so on. As mentioned above, the virtual user devices encompass applications, services, accounts, etc. provided by one or more computing devices. The device-related information 810 can also specify the capabilities of the user X's devices, e.g., by describing the application and hardware resources provided by each such user device.

Digital asset-related information 812 describes information created or accessed by the user X. For example, without limitation, the asset-related information 812 can encompass text documents, image items (e.g., photographs), video items, audio items (e.g., songs), web pages, and so on.

Action/event-related information 814 describes actions that user X has performed over a span of time. For example, the action/event-related information can identify patterns of actions performed by user X, as well as individual one-off actions that user X has performed. A score can be associated with an action to identify how frequently the user X engages in that action, e.g., corresponding to a link strength which connects that action to the user X.

Time-related information 816 describes the timing of the user X's activities and other events. For example, the time-related information can describe the time of occurrence of one-off actions performed by user X, the timing of periodic events, and the temporal characteristics of the user X's habits.

The categories described above are set forth in the spirit of illustration, not limitation. Other implementations can include additional categories that are not shown in FIG. 8. Alternatively, or in addition, other implementations can omit one or more categories shown in FIG. 8.

Further note that FIG. 8 shows a radial pattern in which environment-related nodes radiate out from a center node, associated with the user X. But the graph may reflect a mesh of connections. For instance, the nodes associated with the place-related information 808 may be linked with nodes associated with the time-related information 816; those links may provide information regarding the times at which user X visits the identified locations.

Different implementations can use different respective data structures to express the mesh of interconnected nodes. To cite merely one implementation, the graph-forming component 110 can create an action node associated with a particular action when the user X performs that action. For example, assume that the user interacts with a particular user device to access a particular piece of content from a particular online source. The graph-forming component 110 can create a node that is associated with the action of retrieving a piece of content (assuming that this node has not already been created). That action node can be associated with one or more contextual factors that identify the context in which the action occurred, such as a contextual factor for time, a contextual factor for place, a contextual factor for the content that was accessed, a contextual factor for the source from which the content item was retrieved, a contextual factor for the user device used to retrieve the content item, a contextual factor for a presence of another person, and so on. The graph-forming component 110 can create a node for each contextual factor (if it has not already been created). The graph-forming component 110 can also create a link between each contextual factor node and each other node associated with the action that has been performed. The link strength between any two nodes depends, at least in part, on the frequency of empirical co-occurrence of the two factors associated with those two respective nodes.

The graph-forming component 110 can also add relationships from device-related contextual sources. For example, the graph-forming component 110 can determine the capabilities of each user device that the user X owns based on telemetry information and/or reference sources (to be described below). The graph-forming component 110 can then add capability nodes which branch off of each user device node in the user graph. Each such capability node identifies a capability of an associated user device.

In addition, the user X can expressly add and delete relationships in the user graph. For example, assume that the graph-forming component 110 learns that the user frequently accesses a particular website while riding a bus on the way to work. The user X may wish to nullify this relationship for any reason, e.g., because the user purchases a car and no longer rides the bus to work. In other cases, the user may sever a friendship, and therefore sever a link in the user graph which reflects that friendship. The user X can also create explicit negative relationships, e.g., by explicitly specifying that a particular user device is never to be used when one or more contextual factors are present.

Note that the user graph formed in the above manner provides a nuanced and multi-dimensional snapshot of the user's inclinations. For example, the user graph may indicate that the user has a close relationship with a first group of people with respect to some activities, but not other activities.

In another implementation, the graph-forming component 110 can use a multi-dimensional table to record the activities of the user X. Each entry in the multi-dimensional table can identify the action that was performed, together with all of the contextual factors that were associated with that action. In other words, that entry corresponds to one node in a multi-dimensional space. Another entry, pertaining to the same action but with respect to another set of contextual factors, defines another node in the multi-dimensional space. The graph-forming component 110 can increment a count in the table when the user repeats the same action, given the same set of contextual factors. The count can be regarded as a strength value which measures the strength of a link connecting a particular node in multi-dimensional space and the user X.

To repeat, there are many ways of expressing the above-described multi-dimensional data in a data structure. The above two examples are cited way of illustration, not limitation.

Figure 9:
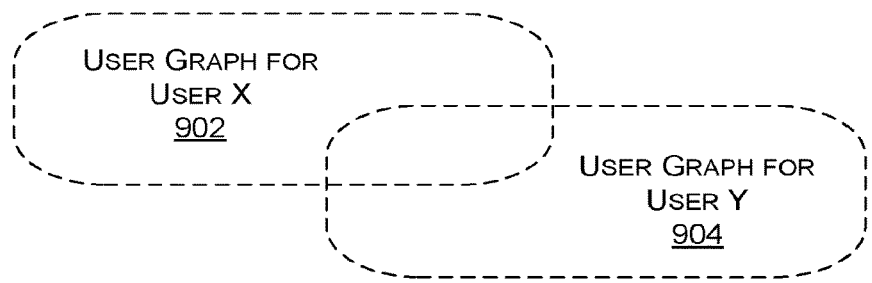
FIG. 9 shows two user graphs.

FIG. 9 shows two user graphs, a first user graph 902 associated with user X and a second user graph 904 associated with user Y. FIG. 9 serves as a vehicle for making two points. As a first point, note that the graph-forming component 110 can maintain its collection of user graphs in different ways. In one approach, the graph-forming component 110 can maintain standalone user graphs associated with respective users. In such an approach, no node in any user graph makes reference to any node in any other user graph. In another approach, the graph forming component 110 can maintain links which connect nodes associated with different graphs. For example, the user X's user graph may have a node which identifies his wife as an inner circle person, corresponding to user Y. That node associated with the user Y may have a pointer which links to the user Y's user graph. Similarly, the user Y's user graph may have a pointer which links to the user X's user graph.

As a second point, the routing system 104 can combine two or more user graphs together in different circumstances. For example, assume that a user V and user W have met up to take a trip together, but do not otherwise know each other's communication preferences. The routing system 104 can examine the user graphs of user V and user W to determine that both users prefer to use a certain type of user device and a certain type of communication application. The routing system 104 can choose that common user device type and communication application to handle any communications between user V and user W during the trip.

Figure 10:
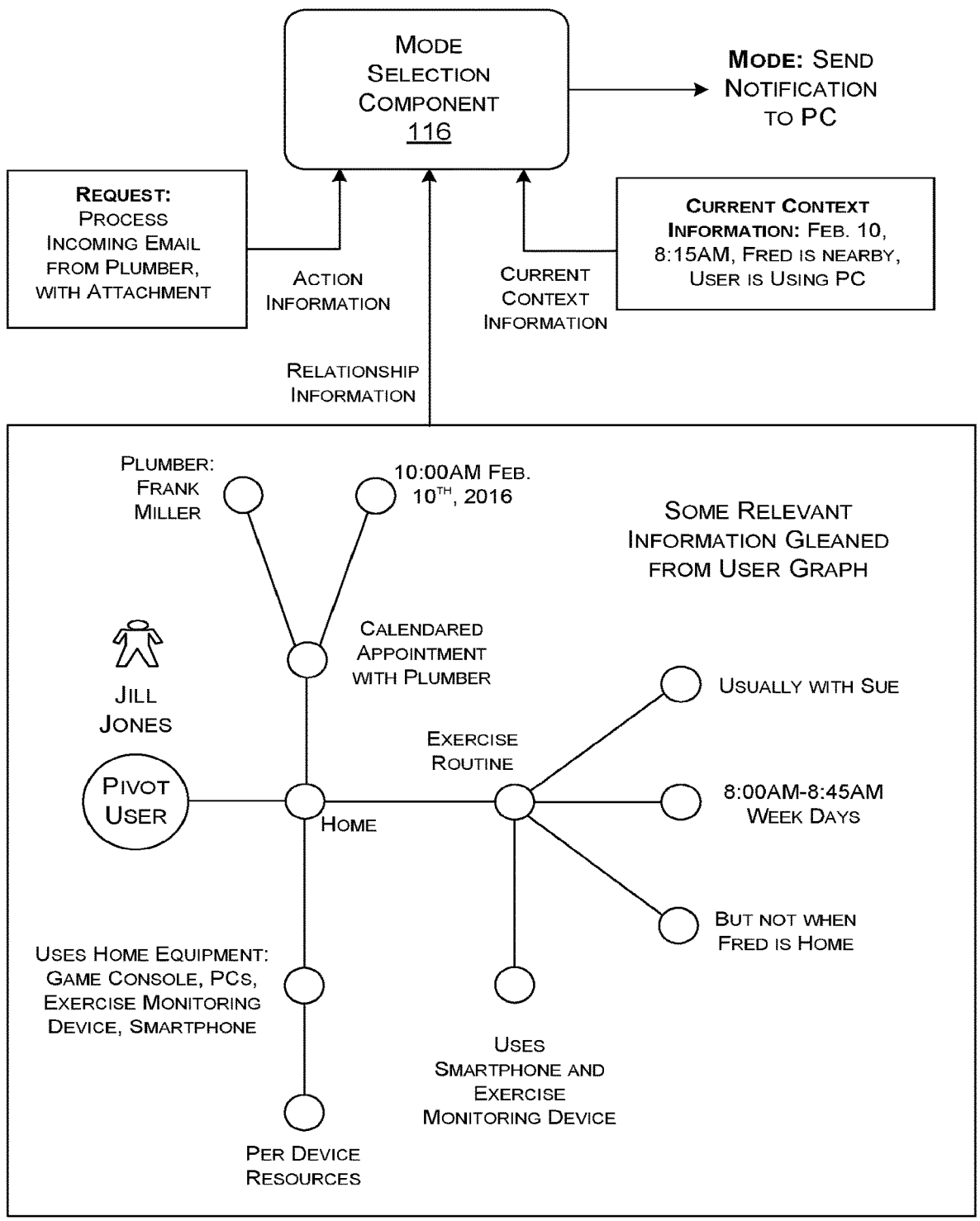
FIG. 10 depicts an example in which the routing system leverages specific relationship information extracted from a user graph to address a specific request.

FIG. 10 illustrates the way in which the mode selection component 116 can leverage relationship information extracted from a user graph. The user graph corresponds to a hypothetical user, Jill Jones. As such, a node associated with the person Jill Jones assumes the role of an informational pivot within the user graph. Assume that a plumber, Frank Miller, sends an Email message to Jill Jones to tell her that he will be an hour late to a 10:00 AM appointment. In response to this event, the routing system 104 receives a request to present information to the user Jill Jones, notifying her of the Email message, e.g., as an alert that is presented in an alert region of a user interface presentation and/or an audio alert. The routing system 104 also receives current context information that identifies the circumstances regarding the event. The current context information identifies the time at which the Email message has been sent to the user Jill Jones. The current context information also indicates that Jill Jones is currently at home, along with her husband, Fred. Finally, the current context information indicates that Jill Jones's home personal computing device is currently online.

The routing system 104 mines Jill Jones' user graph for further insight regarding factors that may have a bearing on the delivery of the Email message. The routing system 104 discovers that Jill Jones commonly exercises between 8:00-8:45 AM on week days, but not when her husband is home. The routing system 104 further determines that Jill Jones interacts with a game console, two personal computing devices, and a smartphone while at home. Finally, the routing system 104 determines (based on information supplied by a calendaring system) that Jill Jones has scheduled an appointment with a plumber, Frank Miller, for 10:00 AM, or that an appointment has been automatically scheduled for Jill Jones on her behalf by an automated scheduling agent (e.g., in response to her interaction with the plumber). Although not shown, note that the graph-forming component 110 can also dynamically update the user Jill Jones' user graph in real-time to reflect some or all the current context information, such as the fact that she is currently at home in close proximity to her husband Fred.

Based on all of the information, the mode selection component 116 determines that the Email message from the plumber is likely important; this conclusion is principally based on the fact that the user Jill Jones has scheduled an appointment with that plumber on this particular day. The mode selection component 116 further determines that it is appropriate to deliver the Email notification to the user Jill Jones via one of her two home personal computing devices, referred to as a first home PC, as opposed to a second home PC. The mode selection component 116 reaches this conclusion because the user graph indicates that the user Jill Jones uses her personal computing devices while at home, together with the fact that the contextual information indicates that the first home PC is currently online. The mode selection component 116 may forgo sending the notification to Jill Jones' smartphone. This is because, while Jill Jones frequently uses her smartphone while exercising at this time of the day, she does not do so when her husband is also home; in this case, her husband is, in fact, at home.

Finally, assume that the Email message from the plumber to Jill Jones includes an attachment document. Further assume that a particular reader application is required to present the attachment document. The mode selection component 116 decides to present the Email message on the user's first home PC for the additional reason that it includes the reader application, whereas the smartphone and the game console do not include the reader application.

In an alternative scenario, assume that the second home PC includes the required reader application and is also currently connected to a printer device, whereas the first home PC has the required reader application but is not connected to a printer device. Here, the mode selection component 116 can direct the Email message to both the first home PC (because it is online and includes the required reader application) and the second home PC (because, although not online, it is attached to a printer device). The mode selection component 116 routes the Email message to the second home PC based on the possibility that Jill Jones might want to print the attachment; such a possibility, in turn, can be deduced based on the user's prior practices, as reflected in the user graph.

In a second example, assume that a user X and a user Y are married and have a child, user Z. Assume that the routing system 104 receives current context information that indicates that user X and user Y are attending an event together, such as a meal. Further assume that the user Z sends both the X and user Y a text message. The mode selection component 116 may optionally decide to present the text message to the smartphone of either user X or user Y, but not both, as it is not necessary that they both receive the same message while together. The mode selection component 116 can reach this conclusion based on relationship information extracted from the user graphs for both user X and user Y. For example, the user graphs for both user X and user Y will identify the family relationship of the three users (user X, user Y, and user Z). The user graphs for user X and/or user Y may also specify a preference pertaining to the receipt of text messages in circumstances such as the case described above.

In a third example, assume that a user X receives Email messages from former college friends while at home. The messages pertain to an upcoming trip that the friends will be taking together. The mode selection component 116 may opt to project the Email messages to a television set via a set-top box when it determines that the user X is alone in the room. But the mode selection component 116 may opt to send the Email messages to the user X's smartphone when it detects that the user X's wife is present. This routing rule helps to ensure that the user X's family member will not be exposed to inappropriate content, such as friendly banter among adult friends.

In a fourth example, assume that a user X is riding on a bus to work. The mode selection component 116 can refrain from sending the user X confidential tax documents via the user X's smartphone. Instead, the mode selection component 116 routes the documents to the user's personal computing devices at work. This rule help ensures that the documents will not be inadvertently exposed in public spaces.

In a sixth example, the user X decides to send a message to all of his family members during a vacation. The mode selection component 116 can perform separate analysis with respect to each member of the family, on behalf of each respective member of the family, and choose an appropriate message delivery mode for each such member.

In a seventh example, assume that the user X receives two messages from a user Y and a user Z, respectively, while the user X is in a meeting. The mode selection component 116 can conclude that the message from the user Y is important, while the message from the user Z is not as important. As a result, the mode selection component 116 can select a mode which entails alerting the user X to the arrival of user Y's message using a vibrate signal, via the user X's smartphone. The mode selection component 116 can select a mode which entails alerting the user X to the arrival of user Z's message using voicemail, which does not interfere with user X's meeting. The mode selection component 116 can use similar importance-based processing to alert the user X to important missed calls and unimportant missed calls in different respective ways.

The mode selection component 116 can conclude that the message from user Y is important based on one or more pieces of evidence. Such evidence includes, without limitation: an indication that the sender Y has manually marked the message as important; an indication that the sender Y is a member of user X's inner circle; an indication that the message is from a known sender Y and is also atypical in some regard (as when a coworker calls at night); an indication that the sender Y has attempted to send several messages to user X within a prescribed recent span of time; an indication that user X is scheduled to soon meet the sender Y (as reflected in an appointment in a calendaring system); an indication that the message pertains to an important topic (as when it contains the words "hospital," "accident," "urgent,"; an indication that user X historically accepts calls from the sender Y during meetings or while otherwise engaged in other activities, etc., and so on.

A.4. The Routing System

Figure 11:
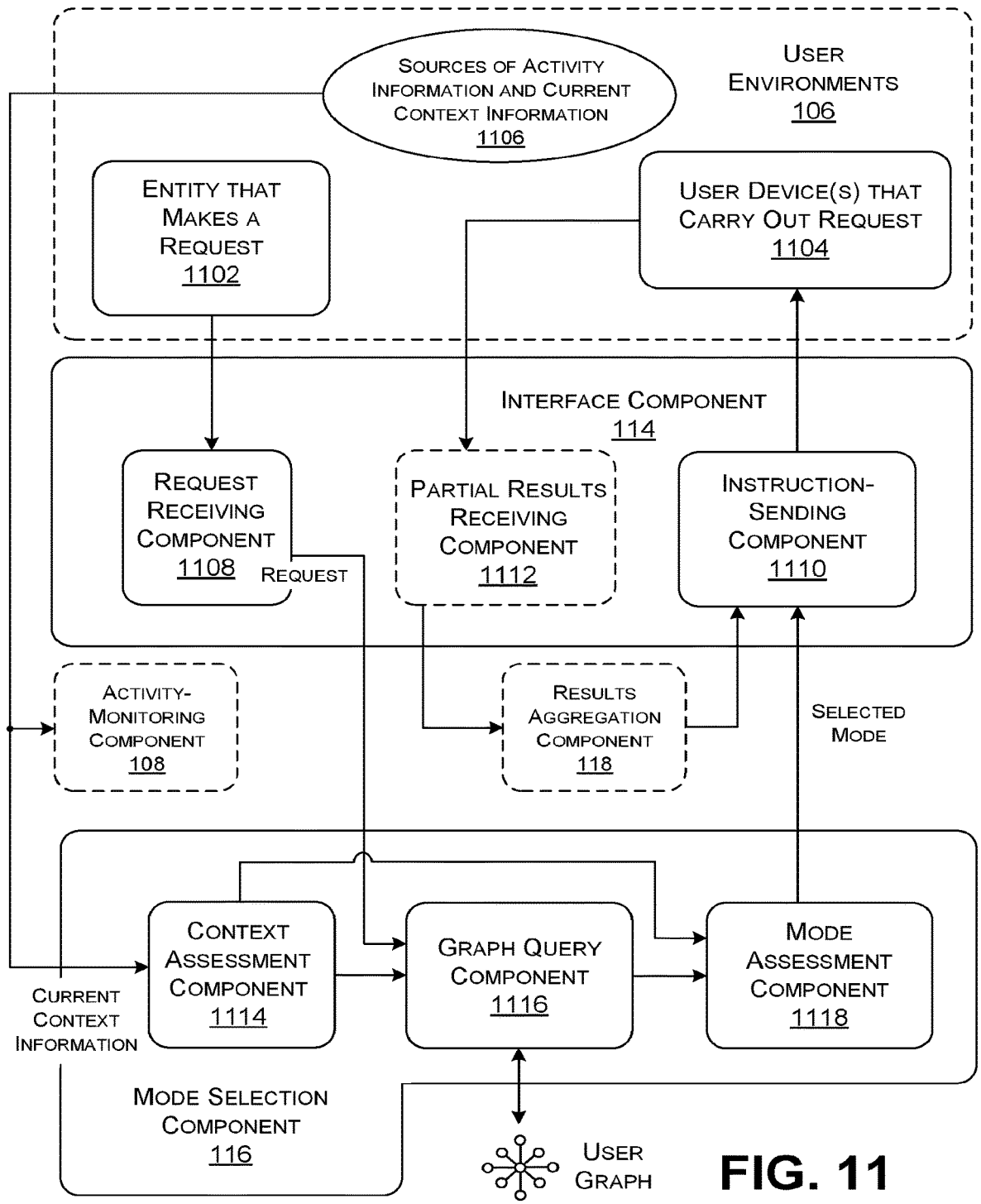
FIG. 11 shows one implementation of certain features of the routing system of FIG. 1, including an interface component, a results aggregation component, and a mode selection component.

FIG. 11 shows one implementation of the user environments 106, the interface component 114, the activity monitoring component 108, the mode selection component 116, and the results aggregation component 118—all introduced in the description of FIG. 1. With respect to the user environments 106, FIG. 11 shows an example of an entity 1102 that generates a request for an action to be performed. FIG. 11 also shows an example of one or more user devices 1104 that carry out the action associated with the request. The entity 1102 that generates the request can correspond to a user device operated by a user. Or the entity 1102 may correspond to some other agent, e.g., corresponding to a reminder agent associated with a calendaring system, etc. The user devices(s) 1104 that carry out the action may correspond to one or more physical user devices associated with a user X and/or one or more virtual user devices.

FIG. 11 also generally indicates that the user environments 106 contain various sources 1106 that provide activity information and current context information. Activity information describes the behavior of users within the user environments 106 over a span of time. The activity information describes the behavior along two main dimensions. First, the activity information describes actions performs by the users within the user environments 106. Second, the activity information describes the environmental context of the behavior, e.g., generally corresponding to the "surrounding circumstances" in which the behavior is performed. The activity monitoring component 108 receives the activity information. The graph-forming component 110 (to be described below with reference to FIG. 12) generates (and updates) the user graphs on the basis of the activity information.

The current context information describes the current circumstance in which a request for an action is made. For example, the current context information for the example shown in FIG. 11 describes the circumstances that pertain to the event in which the entity 1102 makes a request for an action to be performed. The mode selection component 116 performs its analysis based on the current context information in conjunction with relationship information extracted from one or more user graphs.

The sources 1106 include the user devices that the users use to interact with the environments 106, and the sensing and monitoring mechanisms associated therewith. For instance, with respect to user X, the sources 1106 mainly correspond to all of the user devices that are associated with user X, including physical user devices and virtual user devices. With respect to user Y, the sources 1106 correspond to all of the user devices that are associated with user Y, and so on.

Consider the illustrative case of user X who interacts with a portable user device, such as a smartphone, over a span of time. The sources 1106 in this instance can include a reporting mechanism provided by the user device (or some network-side agent) which identifies the applications and services accessed by the user X, the digital assets (e.g., documents) created or accessed by the user X, and the times at which these access events occurred. The sources 1106 can also include one or more position-determining mechanisms (such as a Global Position System mechanism) provided by the user device. The sources 1106 can also include any mechanisms by which the user device can determine its location relative to other user devices and associated users, such as a Near Field Communication (NFC) mechanisms, beacon-based proximity-determination mechanisms (e.g., Bluetooth Low Energy (BLE) beacons, etc.), and so on. The sources 1106 can also include any motion-sensing and orientation mechanisms (e.g., accelerometers, gyroscopes, magnetometers, etc.) provided by the user device. The sources 1106 can also include any image, video and audio capture mechanisms provided by the user device, and so on. Through these illustrative and non-limiting mechanisms, the sources 1106 can provide information regarding what tasks the user X performs with his user device, when the user X interacts with his user device, where the user X interacts with his user device, and who is near the user X when he interacts with his user device, etc.

In addition, each user device can provide telemetry information which indicates its current status and capabilities. For example, a user device (and its associated applications) can provide presence information that identifies whether the user is currently interacting with the user device (and its associated applications). The user device can also report: what applications, services, and accounts it has access to; its communication capabilities (e.g., whether or not it is wireless-enabled, etc.); its inclusion (or non-inclusion) of specialized hardware (e.g., Graphical Processing Units (GPUs), etc.); its current memory load; its current CPU load; its current battery level; its current signal strength, and so on. The routing system 104 can leverage any of these device presence and capability factors to determine the appropriateness of allocating an action to a particular user device.

The sources 1106 can also encompass information provided by one or more network-accessible systems that pertain to the user X. For example, the sources 1106 can include a calendaring system which provides appointment information regarding the user X. The sources 1106 can also include user profile information associated with the user X, maintained by any service(s), such as one or more social network sites. The user profile information may identify the interests of the user X, as explicitly specified by the user X himself. The sources 1106 may also include logs maintained by any network-accessible systems that identify the queries, purchases, and other online activities performed by the user X. The sources 1106 can also include logs provided by any communication mechanisms that identify the messages exchanged between user X and other users, and so on.

The sources 1106 can also correspond to any other electronic equipment that is capable of providing signals that have a bearing on what is happening in the environments 106, where that equipment is not necessary associated with user devices. For instance, the sources 1106 can encompass user-agnostic equipment that monitors the environments 106, such as weather monitoring equipment, traffic monitoring equipment, network performance measurement equipment, market monitoring equipment, and so on.

To further illustrate the nature of the sources 1106, consider the concrete example of FIG. 10. The routing system 104 can determine that the user (Jill Jones) has scheduled a meeting with a plumber based on appointment information created by the user in a calendaring system, or based on an appointment that is automated created by a scheduling agent on behalf of the user (e.g., based on communication between the user and the plumber). The routing system 104 can determine that the user (Jill Jones) is home at the moment based on position information provided by the user's smartphone. The routing system 104 can determine that the user (Jill Jones) engages in a daily exercise routine based on data provided by network-connected exercise monitoring equipment with which the user interacts while exercising. The user's calendar may also specify her daily schedule, including her daily exercise routine. The routing system 104 can determine that the user (Jill Jones) is in close proximity to her husband in different ways, e.g., based on: position information provided by the user devices carried by the user (Jill Jones) and her husband, respectively; based on the proximity of the user devices to a common beacon (e.g., a Wi-Fi beacon, a BLE beacon, etc.); based on NFC signal information provided by one or more of the user devices; based on ambient listening mechanisms provided by one or more of the user devices, and so on. The routing system 104 can determine the resource capabilities of Jill Jones' user devices based on information explicitly provided by the user (Jill Jones) and/or based on information that can be collected through telemetry from the user devices.

In all cases, the routing system 104 maintains appropriate safeguards to ensure that any use of personal information is in compliance with applicable laws, societal norms, and the preferences of the individual user. For example, the routing system 104 may collect and utilize the personal information for a user only after being given explicit permission by the user to do so.

Advancing to the interface component 114, this component 114 includes a request receiving component 1108 that receives a request from the entity 1102 and then subsequently forwards that request to the mode selection component 116. The interface component 114 also includes an instruction-sending component 1110 that receives an indication of a selected mode from the mode selection component 116. The selected mode determines how the action specified in the request is to be carried out. In response to receiving the selected mode, the instruction-sending component 1110 sends an instruction to all user devices that will be involved in carrying out the action (which, in many cases, will only correspond to a single user device). The instruction instructs the user device(s) to carry out the action.

A partial results receiving component 1112 operates in certain scenarios to receive partial results from one or more user devices that have been instructed to carry out actions, such as the user device(s) 1104. In query-related scenarios, a particular user device may provide partial results by executing a search with respect to its local data store(s) and generating partial results which reflect the outcome of its search.

The results aggregation component 118 aggregates the partial results provided by plural user devices, to generate final results. In doing so, it can optionally remove duplicate information. The results aggregation component 118 then instructs the instruction-sending component 1110 to report the final results to the requesting entity which initiated the search. The instruction-sending component 1110 performs this task by using a selected delivery mode (identified by the mode selection component 116) to report the final results to the requesting entity.

Now with respect to the mode selection component 116, a context assessment component 1114 forwards the current context information that has been supplied (by the sources 1106) to a graph query component 1116. The context assessment component 1114 can optionally perform processing on the raw context information to generate higher-level conclusions pertaining to context. For example, the context assessment component 1114 can determine that two users are located in close proximity to each other by comparing the position information that is separately generated by the user devices carried by the two users.

The graph query component 1116 accesses one or more user graphs based on the circumstance in which it is invoked. For example, assume that the action to be performed involves the presentation of a notification to a particular user X. In response, the graph query component 1116 can retrieve the user graph associated with user X. In other circumstances, the graph query component 1116 can extract two or more user graphs. The graph query component 1116 can also (optionally) extract a subset of information from any user graph, rather than the entirety of the user graph. For example, with respect to the example of FIG. 10, the current context information indicates that the user is currently at home. In response to this finding, the graph query component 1116 can optionally filter the complete user graph associated with that user to extract only the part of the graph that is relevant to activities that the user performs at home.

A mode assessment component 1118 receives relationship information extracted by the graph query component 1116, together with the current context information provided by the context assessment component 1114. The mode assessment component 1118 then determines a mode with which to carry out the action. The mode identifies the user device(s) that are to be used to carry out a requested action. In addition, the mode may identify the manner in which the user device(s) are to carry out the requested action.

The mode assessment component 1118 can use various technologies and techniques to determine the mode. In one approach, the mode assessment component 1118 can apply a machine-learned model. The machine-learned model can accept feature values that characterize the requested action, relationship information (extracted from the user graph(s)), and the current context information. In response, the machine-learned model can output a value which maps to a particular mode. The machine-learned model can correspond to any statistical model that is trained based on a corpus of training examples. For instance, without limitation, the machine-learned model may correspond to a linear regression model, a decision tree-type model, a Bayesian network-type model, a deep-learning neural network model, a support vector machines (SVMs) model, etc. A training example corresponds to a data set which includes particular action information (specifying a particular action), particular relationship information, and particular context information, together with a label which indicates an appropriate way of performing the action.

In another approach, the mode assessment component 1118 can apply a rules-based system that applies rules that have been manually specified by an expert-developer. One type of rule corresponds to an IF-THEN rule. Such a rule posits that a particular mode applies for given set of input conditions, defined by the action information, relationship information and the current context information. In other examples the mode assessment component 1118 can apply a hybrid model that uses two or more different techniques, such as a statistical model in combination with a rules-based system.

To cite merely one particular rules-based algorithm, the mode assessment component 1118 can first identify the action that is being requested by either the user or some external entity. One such action, for example, may correspond to a request to present a message to the user, where that message has been sent from a particular source. The mode assessment component 1118 can consult the user graph to determine the subset of user devices which the user has previously used to receive a message. For each such user device, the user graph also describes the contextual factors associated its prior use, and the strengths of the relationships connecting those factors to the user device. The mode assessment component 1118 can then assign a score to each user device based on a weighted sum of contextual factors pertaining to the user device. That is, $score_{d1}=w_1*factor_1 + w_2*factor_2, \ldots, +w_n*factor_n$, where $score_{d1}$ is the score assigned to device d1, $factor_i$ reflects a link strength connecting the user device to a particular contextual factor (but which is set to zero if this contextual factor is not exhibited in the current circumstance), and $w_i$ reflects an empirically-derived weighting value. For example, assume that the user is currently at home in the presence of his wife at 5:00 PM. The user graph indicates that the user has received a message with his smartphone on a prior occasion. The user graph further indicates that the user frequently uses his smartphone at home, and frequently uses his smartphone in the presence of his wife, but rarely uses his smartphone during supper. The mode assessment component 1118 generates a score based on all of these findings. Overall, the mode assessment component 1118 picks the user device having the most favorable score. In other implementations, a negative relationship expressed in the graph can rule out a candidate user device, as when the user explicitly indicates that he does not wish to receive messages via his smartphone during supper.

In other cases, the mode assessment component 1118 can use graph ranking algorithms to rank the suitability of user devices identified in a user graph, such as, without limitation, the PageRank algorithm.

In some implementations, a training/development system (not shown) develops a base statistical model and/or rules-based system that is the same for all users (although, in the runtime phase of operation, the model will provide different results for different users based on differences in the user graphs associated with the different users). In other cases, the training/development system develops a base statistical model and/or rules-based system that is customized for each user. In still other cases, the training/development system develops a statistical model and/or rules-based system that has a user-agnostic portion and a user-customized portion.

The mode assessment component 1118 can also incorporate a mechanism that allows a user to customize its performance in the course of its use, e.g., by specifying one or more custom rules after the statistical model and/or rules-based system has been installed. The mode assessment component 1118 can also incorporate learning functionality. The learning functionality automatically updates the behavior of the mode assessment component 1118 on a per-user basis based on feedback from the each user. The feedback indicates whether a user is satisfied with each decision made by the mode assessment component 1118. In one case, the learning functionality can collect new training examples that reflect the user's feedback and then periodically retrain the statistical model for that user based on the user's feedback.

Finally, the mode assessment component 1118 can invite the user to manually choose from among candidate modes in certain cases, as when the mode assessment component 1118 cannot determine the superiority of one mode to another. The learning functionality provided by the mode assessment component 1118 can automatically adapt its classification behavior based on the user's manual selections.

Figure 12:
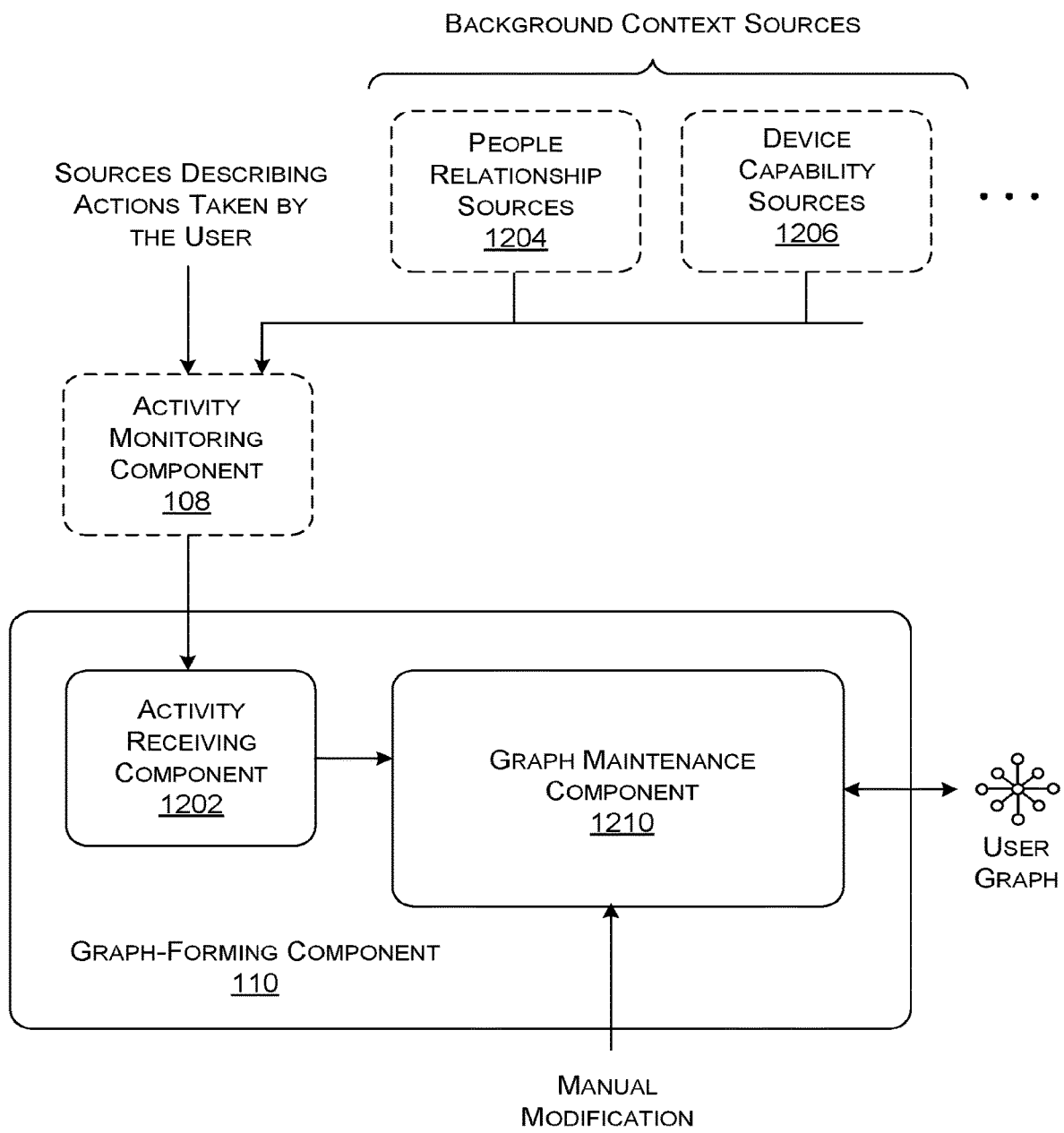
FIG. 12 shows one implementation of a graph-forming component, which is another component of the routing system of FIG. 1.

FIG. 12 shows one implementation of the graph-forming component 110. The purpose of the graph-forming component 110 is to create and maintain a plurality of user graphs. The graph-forming component 110 includes an activity receiving component 1202 that receives activity information from the sources 1106 (described above with reference to FIG. 11) via the activity monitoring component 108. The activity information reflects the actions taken by the users, together with the contexts in which the actions were performed.

More specifically, the sources 1106 can be conceptualized as forming two general categories of sources. A first category of sources provides activity information of a generally transient nature, e.g., by describing, on a particular occasion, what action a user has performed and the immediate context in which that action was performed (e.g., by describing when the user performed the action, where the user performed the action, with whom the user performed the action, etc.). A second category of sources, referred to herein as background sources, provide more slowly varying context information regarding the user himself or herself, and the physical environment in which the user operates.

The first category of sources was described in detail above. With respect to the second category of sources, one or more people relationship sources 1204 provide information regarding the relationships among people. For instance, the people relationship sources 1204 may correspond to profile information explicitly created by the users, social network information, contact information, and so on. The people relationship sources 1204 can also include information pertaining to the hierarchies of organizations; that information identifies the relation of one person in the organization relative to other people in the organization.

The people relationship sources 1204 can also include an inference engine that determines the relationship between people based on the manner in which these people interact with each other, e.g., based on lower-level activity information provided by the activity monitoring component 108. For instance, the inference engine can conclude that one person is an inner-circle relation with respect to another person when a volume of messages exchanged between these two people exceeds an environment-specific threshold. In another case, the inference engine can conclude that a recipient of an Email message is a mother to a sender when the Email messages sent by the sender address the recipient as "Mom," etc. In addition, or alternatively, the inference engine can identify a close relationship between people based on the permissions that these people grant to each other, and so on. This inference engine can be implemented in any way, e.g., an equation, algorithm, machine-trained model, rules-based system, etc., or combination thereof.

One or more device capability sources 1206 provide information regarding the capabilities of user devices and other processing resources. For instance, the device capability sources 1206 can include technical reference sources, telemetry-based functionality which detects and reports the capabilities, and so on.

A graph maintenance component 1210 forms and maintains users graphs based on the above-described input information that is fed to it. For instance, the graph maintenance component 1210 can add a link to a user X's user graph when the input information indicates that the user X has established a new relationship. For example, assume that the user X visits a new location, and that one of the user X's devices reports this event. The graph maintenance component 1210 can memorialize this event by adding a new node to the user X's user graph, associated with the new location, together with a new link that connects the pivot node (associated with the user X) with the new location node. The graph maintenance component 1210 can also add other links and nodes to describe other contextual aspects of the user's visit to the new location. The graph maintenance component 1210 can also assign a weight value (score) to each link which reflects the degree of association between the two features connected by the link. Initially the weight value will be low; but the graph maintenance component 1210 can increase the weight value as a function of the number of times that the features co-occur.

The graph maintenance component 1210 can also include various strategies for deemphasizing nodes and relationships that reflect stale user interests. For example, the graph maintenance component 1210 can use a decay function to decrease the weight value of a link over time. The graph maintenance component 1210 can completely remove a node and link when the weight value drops below a prescribed threshold, which will happen if the user does not show fresh interest in the relationship.

The graph maintenance component 1210 can apply any functionality to decide how it creates and modifies a user graph, such as a statistical model, a rules-based system, one or more equations or algorithms, and so on, or any combination thereof. The graph maintenance component 1210 can also include an interface which allows a user to manually modify any aspect of his her user graph.

B. Illustrative Processes

Figure 13:
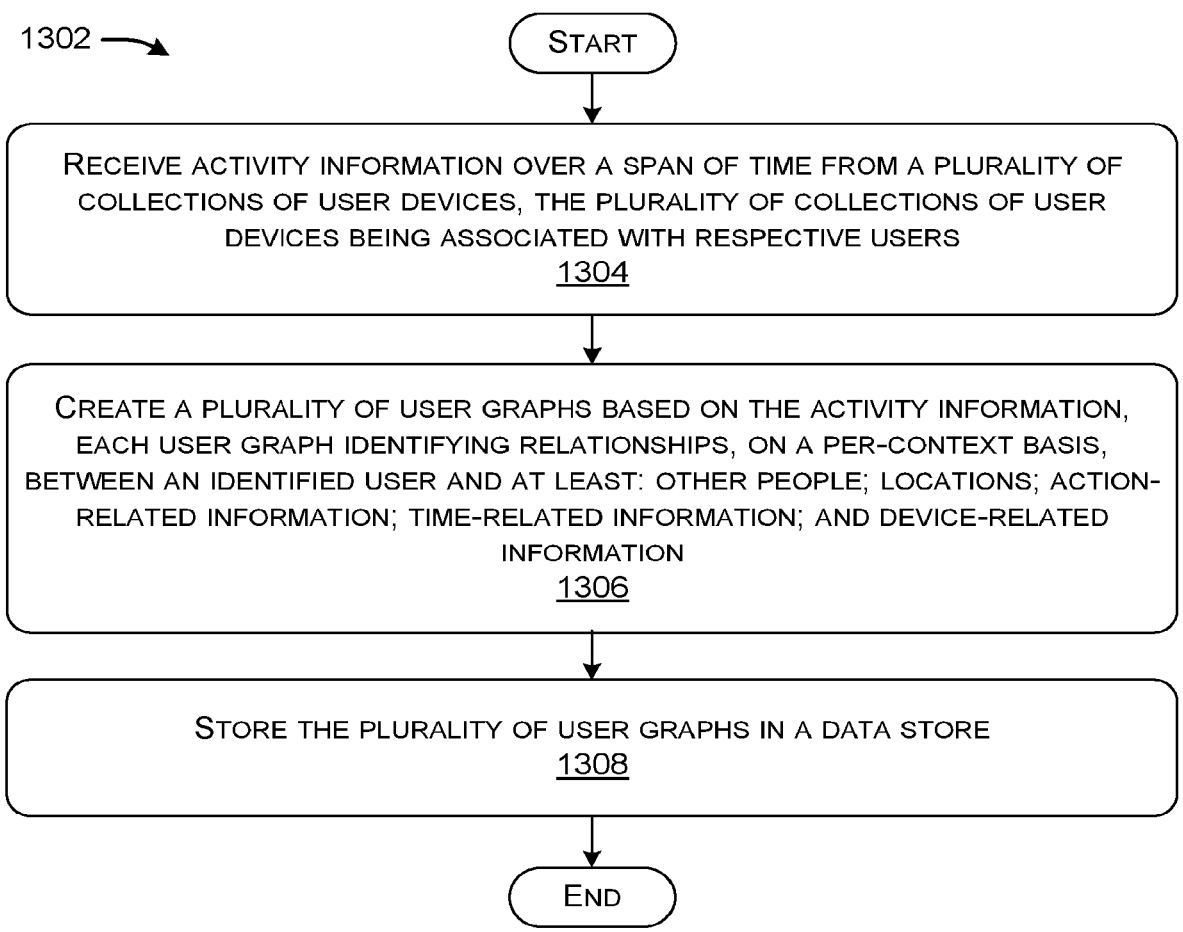
FIG. 13 shows a process that represents one manner of operation of the graph-forming component of FIG. 12.
Figure 14:
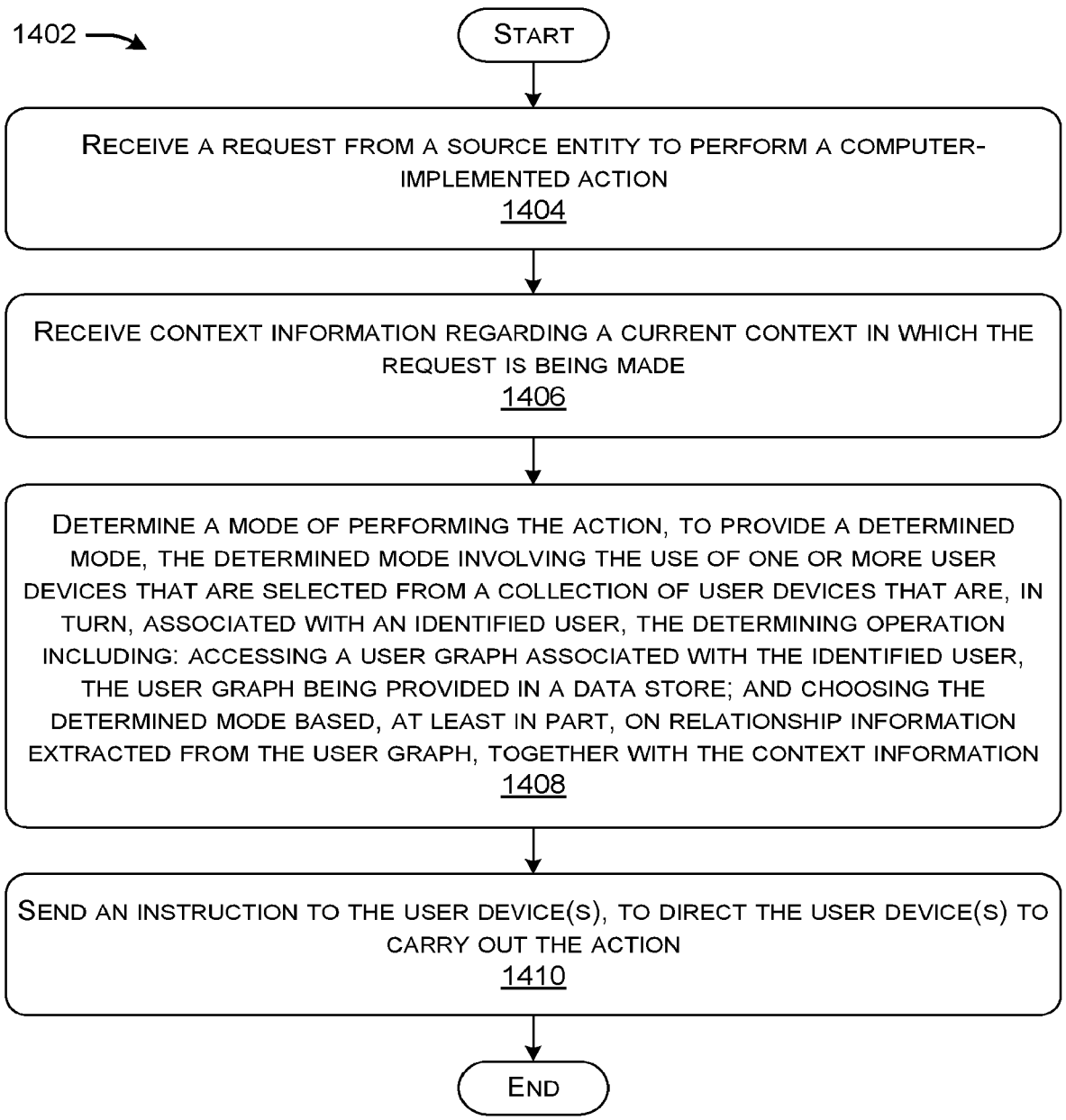
FIG. 14 shows a process that represents one manner of real-time operation of the routing system of FIG. 1, e.g., when the routing system is applied to handle a request.

FIGS. 13 and 14 shows processes (1302, 1402) that explain the operation of the routing system 104 of Section A in flowchart form. Since the principles underlying the operation of the routing system 104 have already been described in Section A, certain operations will be addressed in summary fashion in this section. As noted in the prefatory part of the Detailed Description, the flowchart is expressed as a series of operations performed in a particular order. But the order of these operations is merely representative, and can be varied in any manner.

FIG. 13 shows a process 1302 that represents one manner of operation of the graph-forming component 110 of FIG. 1. In block 1304, the graph-forming component 110 receives activity information over a span of time from a plurality of collections of user devices, the plurality of collections of user devices being associated with respective users. In block 1306, the graph-forming component 110 creates a plurality of user graphs based, at least in part, on the activity information. In block 1308, the graph-forming component 110 stores the user graphs in the data store 112. Each user graph identifies relationships, on a per-context basis, between an identified user and at least: other people; locations; action-related information; time-related information; and device-related information.

FIG. 14 shows a process 1402, implemented by one or more computing devices, for processing a request to perform a computer-implemented action. In operation 1404, the routing system 104 receives a request from a source entity to perform a computer-implemented action. In block 1406, the routing system 104 receives current context information regarding a current context in which the request is being made. In block 1408, the routing system determines a mode of performing the action, to provide a determined mode. The determined mode involves use of one or more user devices that are selected from a collection of user devices that are associated with an identified user.

More specifically, the routing system 104 determines the mode by accessing a user graph (provided in the data store 112) associated with the identified user. As noted above, the user graph identifies per-context relationships between the identified user and at least: other people; locations; action-related information; time-related information; and device-related information. The relationships in the user graph are formed over a span of time based at least on activity information reported by the collection of user devices that are associated with the identified user. The determining operation further includes choosing the determined mode based, at least in part, on information extracted from the user graph, together with the current context information.

Finally, in operation 1410, the routing system 104 sends an instruction to the user device(s), to direct the user device(s) to carry out the action.

C. Representative Computing Functionality

Figure 15:
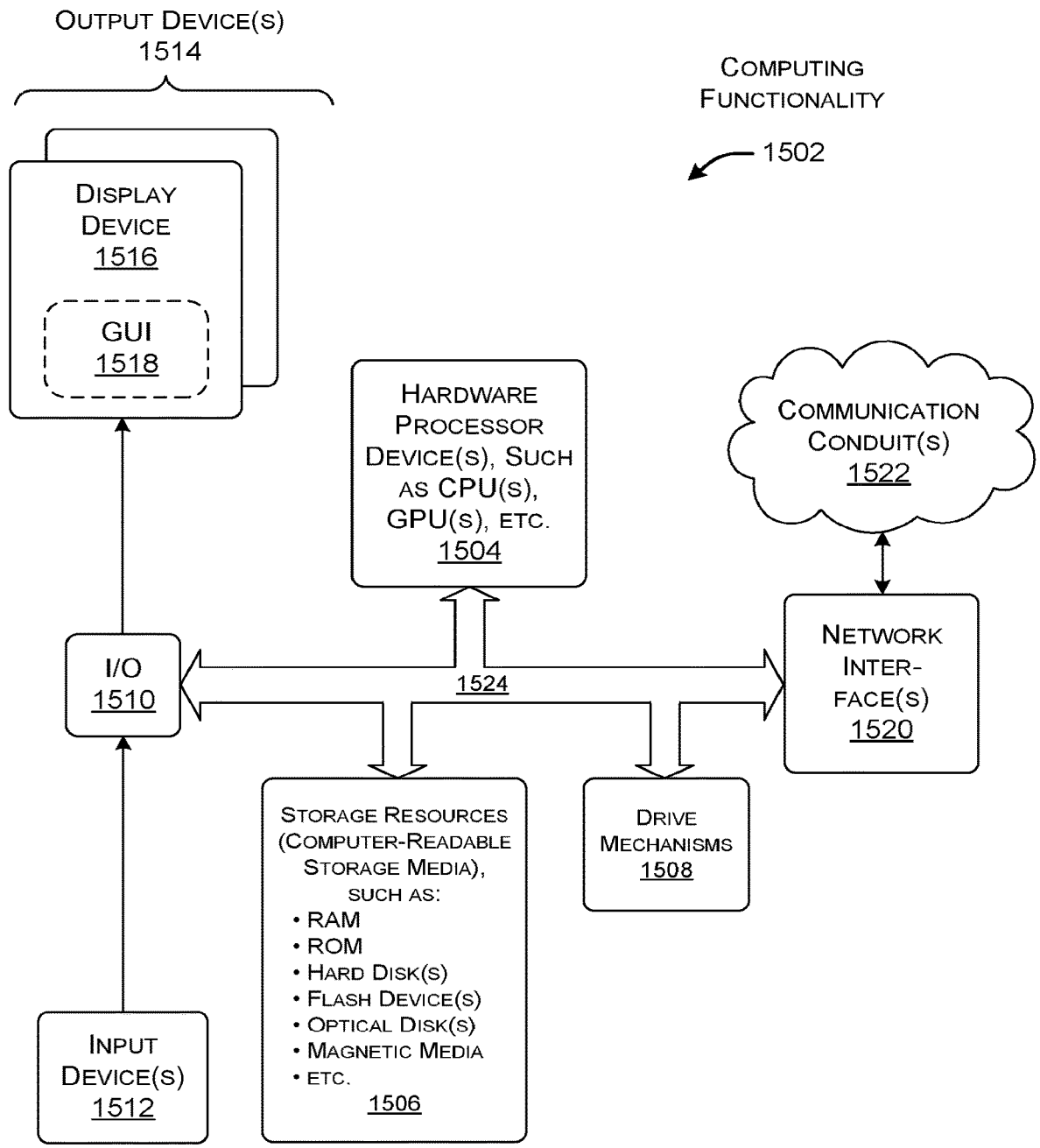
FIG. 15 shows illustrative computing functionality that can be used to implement any aspect of the features shown in the foregoing drawings.

FIG. 15 shows computing functionality 1502 that can be used to implement any aspect of the mechanisms set forth in the above-described figures. For instance, the type of computing functionality 1502 shown in FIG. 15 can be used to implement any of the local computing equipment 208 and/or the remote computing equipment 204 of FIG. 2. In all cases, the computing functionality 1502 represents one or more physical and tangible processing mechanisms.

The computing functionality 1502 can include one or more hardware processor devices 1504, such as one or more Central Processing Units (CPUs), and/or one or more Graphical Processing Units (GPUs), and so on. The computing functionality 1502 can also include any storage resources (also referred to as computer-readable storage media or computer-readable storage medium devices) 1506 for storing any kind of information, such as machine-readable instructions, settings, data, etc. Without limitation, for instance, the storage resources 1506 may include any of RAM of any type(s), ROM of any type(s), flash devices, hard disks, optical disks, and so on. More generally, any storage resource can use any technology for storing information. Further, any storage resource may provide volatile or non-volatile retention of information. Further, any storage resource may represent a fixed or removable component of the computing functionality 1502. The computing functionality 1502 may perform any of the functions described above when the hardware processor device(s) 1504 carry out computer-readable instructions stored in any storage resource or combination of storage resources. The computing functionality 1502 also includes one or more drive mechanisms 1508 for interacting with any storage resource, such as a hard disk drive mechanism, an optical disk drive mechanism, and so on.

The computing functionality 1502 also includes an input/output component 1510 for receiving various inputs (via input devices 1512), and for providing various outputs (via output devices 1514). Illustrative input devices include a keyboard device, a mouse input device, a touchscreen input device, a digitizing pad, one or more video cameras, one or more depth cameras, a free space gesture recognition mechanism, one or more microphones, a voice recognition mechanism, any movement detection mechanisms (e.g., accelerometers, gyroscopes, etc.), and so on. One particular output mechanism may include a display device 1516 and an associated graphical user interface presentation (GUI) 1518. The display device 1516 may correspond to a charge-coupled display device, a cathode ray tube device, a projection mechanism, etc. Other output devices include a printer, a model-generating mechanism, a tactile output mechanism, an archival mechanism (for storing output information), and so on. The computing functionality 1502 can also include one or more network interfaces 1520 for exchanging data with other devices via one or more communication conduits 1522. One or more communication buses 1524 communicatively couple the above-described components together.

The communication conduit(s) 1522 can be implemented in any manner, e.g., by a local area computer network, a wide area computer network (e.g., the Internet), point-to-point connections, etc., or any combination thereof. The communication conduit(s) 1522 can include any combination of hardwired links, wireless links, routers, gateway functionality, name servers, etc., governed by any protocol or combination of protocols.

Alternatively, or in addition, any of the functions described in the preceding sections can be performed, at least in part, by one or more hardware logic components. For example, without limitation, the computing functionality 1502 (and its hardware processor) can be implemented using one or more of: Field-programmable Gate Arrays (FPGAs); Application-specific Integrated Circuits (ASICs); Application-specific Standard Products (ASSPs); System-on-a-chip systems (SOCs); Complex Programmable Logic Devices (CPLDs), etc. In this case, the machine-executable instructions are embodied in the hardware logic itself.

The following summary provides a non-exhaustive list of illustrative aspects of the technology set forth herein.

According to a first aspect, a method is described, implemented by one or more computing devices, for processing a request to perform a computer-implemented action. The method includes: receiving a request from a source entity to perform a computer-implemented action; receiving current context information regarding a current context in which the request is being made; and determining a mode of performing the action, to provide a determined mode, the determined mode involving use of one or more user devices (device(s)) that are selected from a collection of user devices that, in turn, are associated with an identified user. The above-referenced determining operation includes accessing a user graph associated with the identified user, the user graph being provided in a data store. The user graph identifies relationships, on a per-context basis, between the identified user and at least other people, locations, action-related information, time-related information, and device-related information. The relationships in the user graph are formed over a span of time based at least on activity information reported by the collection of user devices that are associated with the identified user. The determining operation also includes choosing the determined mode based, at least in part, on relationship information extracted from the user graph, together with the current context information. The method then includes sending an instruction to the user device(s), to direct the user device(s) to carry out the action.

According to a second aspect, at least one of the collection of user devices corresponds to a physical user device associated with the user.

According to a third aspect, at least one of the collection of user devices corresponds to functionality provided by one or more physical user devices.

According to a fourth aspect, the action corresponds to presentation of incoming information, the source entity corresponds to a sender of the incoming information, the identified user corresponds to a recipient of the incoming information, and the user device(s) perform the action by presenting the incoming information to the identified user.

According to a fifth aspect, the action corresponds to presentation of outgoing information, the source entity is the identified user (corresponding to a sender of the outgoing information), and the user device(s) perform the action by providing the outgoing information to a group of recipients of the outgoing information, the group including at least one member.

According to a sixth aspect, the above-referenced group includes at least one member that is specified in the user graph as having a close relationship to the identified user, wherein the above-referenced choosing operation selects the determined mode based, in part, on the close relationship specified in the user graph.

According to a seventh aspect, the action corresponds to execution of a processing task, the source entity is the identified user, and the user device(s) perform the action by executing the processing task.

According to an eighth aspect, the action corresponds to processing a specified query, the source entity is the identified user, and the user device(s) perform the action by processing the specified query, each of the user device(s) providing partial results.

According to a ninth aspect, the method further includes: receiving one or more instances of partial results from the user device(s); aggregating the instance(s) of partial results to produce final results; and presenting the final results to the identified user.

According to a tenth aspect, one item of contextual information identifies respective locations of at least one person relative to the identified user.

According to an eleventh aspect, wherein, as a first factor, the user graph specifies at least one person who is considered as having a close relationship to the identified user. As a second factor, the current context information indicates that at least one person that is identified in the user graph as having a close relationship to the identified user is currently in close proximity to the identified user. The above-referenced choosing operation includes chooses the mode depending on at least the first factor and the second factor.

According to a twelfth aspect, a routing system, implemented by one or more computing devices, is described for processing a request to perform a computer-implemented action. The system includes an interface component configured to receive a request from a source entity to perform a computer-implemented action. The system also includes an activity monitoring component configured to receive activity information over a span of time from a plurality of collections of user devices, the plurality of collections being associated with respective users. The activity monitoring component is also configured to receive current context information regarding a current context in which the request is being made. The system also includes a graph-forming component configured to form a plurality of user graphs associated with the respective users based, at least in part, on the activity information associated with those respective users, and to store the user graphs in a data store. The system also includes a mode selection component configured to determine a mode of performing the action, to provide a determined mode, the determined mode involving use of one or more user devices (device(s)) that are selected from a collection of user devices that, in turn, are associated with an identified user. The mode selection component is configured to determine the mode by: accessing a user graph associated with the identified user, the user graph identifying relationships, on a per-context basis, between the identified user and at least other people, locations, action-related information, time-related information, and device-related information; and choosing the determined mode based, at least in part, on relationship information extracted from the user graph, together with the current context information. The interface component is further configured to send an instruction to the user device(s), to direct the user device(s) to carry out the action.

According to a thirteenth aspect, the interface component, activity monitoring component, graph-forming component, and mode selection component are implemented, at least in part, by at least one remote computing device that is separate from the collection of user devices that are associated with the identified user.

According to a fourteenth aspect, the interface component, activity monitoring component, graph-forming component, and mode selection component are implemented, at least in part, by one or more of the collection of user devices that are associated with the identified user.

According to a fifteenth aspect, the action corresponds to presentation of incoming information, the source entity corresponds to a sender of the incoming information, the identified user corresponds to a recipient of the incoming information, and the user device(s) perform the action by presenting the incoming information to the identified user.

According to a sixteenth aspect, the action corresponds to presentation of outgoing information, the source entity is the identified user (corresponding to a sender of the outgoing information), and the user device(s) perform the action by providing the outgoing information to a group of recipients of the outgoing information, the group including at least one member.

According to a seventeenth aspect, the action corresponds to execution of a processing task, the source entity is the identified user, and the user device(s) perform the action by executing the processing task.

According to an eighteenth aspect, the action corresponds to processing a specified query, the source entity is the identified user, and the user device(s) perform the action by processing the specified query, each of the user devices providing partial results.

According to a nineteenth aspect, the routing system further includes a results aggregation component that is configured to: receive one or more instances of partial results from the user device(s); aggregate the instance(s) of partial results to produce final results; and present the final results to the identified user.

According to a twentieth aspect, a computer-readable storage medium is described for storing computer-readable instructions. The computer-readable instruction, when executed by one or more processor user devices, performing a method that includes: receiving activity information over a span of time from a plurality of collections of user devices, the plurality of collections being associated with respective users; creating a plurality of user graphs based, at least in part, on the activity information; storing the plurality of user graphs in a data store; receiving a request from a source entity to perform a computer-implemented action; receiving current context information regarding a current context in which the request is being made; and determining a mode of performing the action, to provide a determined mode, the determined mode involving use of one or more user devices (device(s)) that are selected from a collection of user devices that are associated with an identified user. The determining operation includes: accessing a user graph associated with the identified user. The graph identifies relationships, on a per-context basis, between the identified user and at least other people, locations, action-related information, time-related information, and device-related information. The determining operation further includes choosing the determined mode based, at least in part, on information extracted from the user graph, together with the current context information. The method further includes sending an instruction to the user device(s), to direct the user device(s) to carry out the action.

A twenty-first aspect corresponds to any combination (e.g., any permutation or subset) of the above-referenced first through twentieth aspects.

A twenty-second aspect corresponds to any method counterpart, device counterpart, system counterpart, means-plus-function counterpart, computer-readable storage medium counterpart, data structure counterpart, article of manufacture counterpart, graphical user interface presentation counterpart, etc. associated with the first through twenty-first aspects.

In closing, the functionality described herein can employ various mechanisms to ensure that any user data is handled in a manner that conforms to applicable laws, social norms, and the expectations and preferences of individual users. For example, the functionality can allow a user to expressly opt in to (and then expressly opt out of) the provisions of the functionality. The functionality can also provide suitable security mechanisms to ensure the privacy of the user data (such as data-sanitizing mechanisms, encryption mechanisms, password-protection mechanisms, etc.).

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, implemented by one or more computing devices, the method comprising:
   receiving a request to perform a computer-implemented action from a source entity;
   receiving current context information related to the request;
   selecting a selected user device from a collection of user devices associated with a user to carry out the computer-implemented action based at least on the current context information and relationship information stored in association with the user, wherein:
   the current context information includes at least one of a time the request is made, a current location of the user, current locations of other users, current locations of the collection of user devices, or current statuses of the collection of user devices; and
   the relationship information includes at least one of people-related information, location-related information, action-related information, time-related information, or device-related information; and sending an instruction to the selected user device to carry out the computer-implemented action.

2. The method of claim 1, wherein the request is not directed to the selected user device by the source entity.

3. The method of claim 1, wherein the selecting is based at least on the current context information indicating a proximity between the current location of the user and a current location of the selected user device.

4. The method of claim 1, wherein the selecting is based at least on the relationship information indicating a preference of the user to use the selected user device to carry out the computer-implemented action.

5. The method of claim 1, wherein the selecting is based at least on the device-related information indicating that the selected user device has sufficient processing resources to handle the computer-implemented action.

6. The method of claim 1, further comprising:
selecting multiple selected user devices from the collection of user devices to carry out the computer-implemented action;
sending multiple instructions to the multiple selected user devices;
receiving partial results from the multiple selected user devices; and
aggregating the partial results to produce final results.

7. The method of claim 1, wherein the selecting is based at least on additional relationship information associated with another user.

8. The method of claim 1, wherein the source entity is one of the collection of user devices.

9. The method of claim 1, wherein the source entity is not one of the collection of user devices.

10. The method of claim 1, further comprising:
generating the relationship information based at least on past activity information associated with the user.

11. The method of claim 10, further comprising:
receiving the past activity information over a span of time reported by the collection of user devices.

12. The method of claim 1, further comprising:
modifying the relationship information in response to a command from the user to add or delete a relationship.

13. A system, comprising:
one or more data stores storing relationship information associated with a user, the relationship information including at least one of people-related information, location-related information, action-related information, time-related information, or device-related information;
one or more hardware processors; and
at least one computer-readable storage medium storing computer-readable instructions which, when executed by the one or more hardware processors, cause the one or more hardware processors to:
receive a request to perform a computer-implemented action;
receive current context information regarding the request, the current context information including at least one of a time the request is made, a current location of the user, current locations of other users, current locations of a collection of user devices associated with the user, or current statuses of the collection of user devices;
determine one or more selected user devices chosen from the collection of user devices to carry out the computer-implemented action based at least on the current context information and the relationship information; and
instruct the one or more selected user devices to carry out the computer-implemented action.

14. The system of claim 13, wherein the computer-readable instructions further cause the one or more hardware processors to:
generate a graph representing the relationship information associated with the user.

15. The system of claim 14, wherein the computer-readable instructions further cause the one or more hardware processors to:
use the graph to determine the one or more selected user devices.

16. The system of claim 13, wherein the device-related information includes capabilities of the collection of user devices.

17. The system of claim 13, wherein the collection of user devices includes at least one of the following types of devices: a desktop personal computer, a tablet, a smartphone, a game console, a set-top box, a television, a wearable computing device, or a media player.

18. The system of claim 13, wherein the system is at least in part included in at least one of the collection of user devices.

19. The system of claim 13, wherein the system is at least in part remote from the collection of user devices.

20. A computer-readable storage medium storing computer-readable instructions which, when executed by one or more hardware processors, cause the one or more hardware processors to:
receive a request directed to a first device to perform a computer-implemented action;
receive current context information related to the request, the current context information including at least one of a time the request is made, a current location of a user, current locations of other users, current locations of a collection of user devices associated with the user, or current statuses of the collection of user devices;
determine a mode of carrying out the computer-implemented action based at least on one or more factors derived from the current context information and relationship information stored in association with the user, the mode including a selection of a second device selected from the collection of user devices to carry out the computer-implemented action, the second device being distinct from the first device, the relationship information including at least one of people-related information, location-related information, action-related information, time-related information, or device-related information; and
send an instruction to the second device to carry out the computer-implemented action.

* * * * *